(12) United States Patent
Binfet et al.

(10) Patent No.: US 12,530,135 B2
(45) Date of Patent: Jan. 20, 2026

(54) CRYPTOGRAPHIC BLOCK LOCKING IN A NON-VOLATILE MEMORY DEVICE

(71) Applicant: Micron Technology, Inc., Boise, ID (US)

(72) Inventors: Jeremy Binfet, Boise, ID (US); Lance Walker Dover, Fair Oaks, CA (US); Robert William Strong, Folsom, CA (US); Walter Di Francesco, Avezzano (IT); Tommaso Vali, Sezze (IT); Jeffrey Scott McNeil, Jr., Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 221 days.

(21) Appl. No.: 17/804,153

(22) Filed: May 26, 2022

(65) Prior Publication Data

US 2023/0384951 A1 Nov. 30, 2023

(51) Int. Cl.
*G06F 3/06* (2006.01)
(52) U.S. Cl.
CPC .......... *G06F 3/0622* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| 10,855,477 | B2 * | 12/2020 | Hung | G09C 1/00 |
|---|---|---|---|---|
| 2013/0179624 | A1 * | 7/2013 | Lambert | G06F 12/0246 |
| | | | | 711/E12.008 |
| 2020/0389316 | A1 * | 12/2020 | Karp | G06F 21/6218 |
| 2021/0083675 | A1 * | 3/2021 | Chandra | G06F 11/3656 |
| 2022/0191041 | A1 * | 6/2022 | Gerhard | H04L 9/0643 |

FOREIGN PATENT DOCUMENTS

EP 3751572 A1 * 12/2020 .......... G06F 11/0772

* cited by examiner

*Primary Examiner* — Michael Alsip
(74) *Attorney, Agent, or Firm* — Harrity & Harrity, LLP

(57) ABSTRACT

A memory device may be configured to receive a command to access a block of memory that is one of multiple blocks of memory included in the memory device. The memory device may be configured to receive a cryptographic signature associated with the command. The memory device may be configured to enable or disable access to the block of memory based on the command and based on the cryptographic signature. The memory device may be capable of separately restricting access to each individual block of the multiple blocks.

25 Claims, 17 Drawing Sheets

Die  Block
 Plane  Page

1100

CRYPTOGRAPHIC BLOCK LOCKING IN A NON-VOLATILE MEMORY DEVICE

TECHNICAL FIELD

The present disclosure generally relates to memory devices and methods and, for example, to cryptographic block locking in a non-volatile memory device.

BACKGROUND

NAND flash memory, which may also be referred to as a "NAND" or a "NAND memory device," is a non-volatile type of memory device that uses circuitry similar to or resembling NAND logic gates to enable electrically programming, erasing, and storing of data even when a power source is not supplied. NANDs may be used in various types of electronics devices, such as computers, mobile phones, or automobile computing systems, among other examples.

A NAND memory device may include an array of flash memory cells, a page buffer, and a column decoder. In addition, the NAND memory device may include a control logic unit (e.g., a controller), a row decoder, or an address buffer, among other examples. The memory cell array may include memory cell strings connected to bit lines, which are extended in a column direction.

A flash memory cell, which may be referred to as a "cell" or a "data cell," of a NAND memory device may include a current path formed between a source and a drain on a semiconductor substrate. The flash memory cell may further include a floating gate and a control gate formed between insulating layers on the semiconductor substrate. A programming operation (sometimes called a write operation) of the flash memory cell is generally accomplished by grounding the source and the drain areas of the memory cell and the semiconductor substrate of a bulk area, and applying a high positive voltage, which may be referred to as a "program voltage," a "programming power voltage," or "VPP," to a control gate to generate Fowler-Nordheim tunneling (referred to as "F-N tunneling") between a floating gate and the semiconductor substrate. When F-N tunneling is occurring, electrons of the bulk area are accumulated on the floating gate by an electric field of VPP applied to the control gate to increase a threshold voltage of the memory cell.

An erasing operation of the flash memory cell is concurrently performed in units of sectors sharing the bulk area (referred to as "blocks"), by applying a high negative voltage, which may be referred to as an "erase voltage" or "$V_{era}$," to the control gate and a configured voltage to the bulk area to generate the F-N tunneling. In this case, electrons accumulated on the floating gate are discharged into the source area, so that the flash memory cells have an erasing threshold voltage distribution.

Each memory cell string may have a plurality of floating gate type memory cells serially connected to each other. Access lines (sometimes called "word lines") are extended in a row direction, and a control gate of each memory cell is connected to a corresponding access line. A memory device may include a plurality of page buffers connected between the bit lines and the column decoder. The column decoder is connected between the page buffer and data lines.

DETAILED DESCRIPTION

Figure 1:
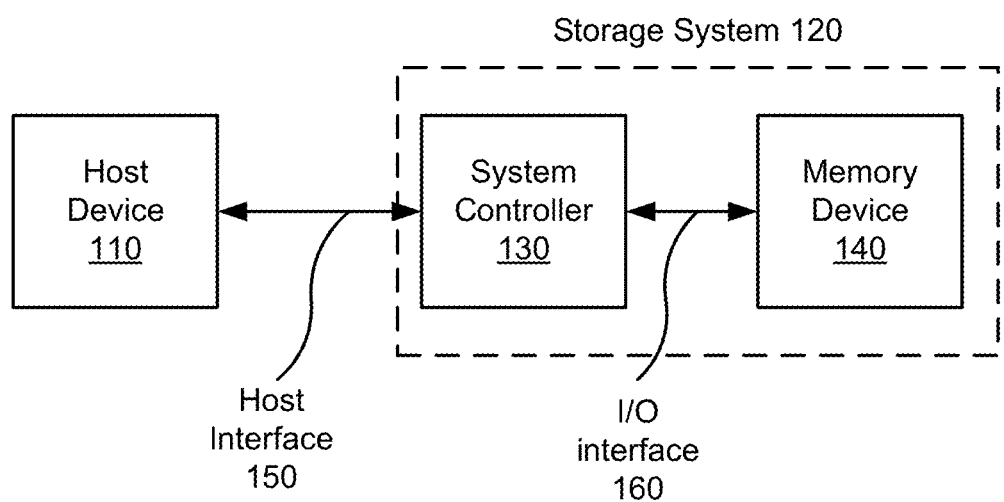
FIG. 1 is a diagram illustrating an example system capable of cryptographic block locking.

To improve security and protect sensitive or important data, a memory device may restrict access to data, such as by restricting read access to data stored in memory, by restricting write access to store data in memory, and/or by restricting erase access to erase data stored in memory. For example, important data may be stored in a read-only block of memory so that this important data cannot be erased or overwritten. However, storing data in read-only memory does not provide flexibility for the data to be overwritten or erased if the stored data needs to be modified.

In some cases, a memory device, such as a NAND memory device, may include a mechanism to globally prevent write access to an entire memory array, such as by using a global write protect pin. When a voltage of the write protect pin is held low, writing and erasing the entire memory array may be disabled. However, this mechanism does not allow enabling and disabling access to individual blocks of memory, rather than the entire memory array. Furthermore, this mechanism may be easily circumvented, such as by removing a connection of the memory device (e.g., the write protect pin) from ground. In some other cases, individual memory blocks of a memory device may be locked, but a data sheet sequence associated with the memory device may be used to unlock those blocks, so this technique is not secure.

Some devices and methods described herein enable individual blocks of memory (e.g., non-volatile memory, such as NAND memory) to be locked or unlocked in a secure manner. For example, an individual block may be locked or unlocked by enabling or disabling read access, write access, and/or erase access to the individual block. Some devices and methods described herein use a cryptographic signature to lock blocks in a flexible and secure manner. Locking or unlocking individual blocks of memory enables more flexibility in data storage and data security. For example, sensitive data or more important data may be stored in a locked block (e.g., requiring a valid cryptographic signature to read, write, and/or erase the locked block), and non-sensitive data or less important data may be stored in an unlocked block (e.g., that does not require a valid cryptographic signature to read, write, and/or erase the unlocked block). As an example, a block can be erased, firmware can be downloaded and stored in the block, and then the block can be locked. The contents of the block can then be verified after the block is locked to confirm that the firmware is trusted and that the downloaded information is not malware or otherwise compromised.

Furthermore, locking an entire memory array, rather than individual blocks, may increase access times needed to read, write, and/or erase data throughout the entire memory array. By individually locking or unlocking blocks, data stored in locked blocks can be secured, while data stored in unlocked blocks can be accessed faster. Although some techniques are described herein in connection with performing cryptographic block locking for non-volatile memory, in some implementations, these techniques may be performed for volatile memory, such as static random-access memory (SRAM) or dynamic random access memory (DRAM).

FIG. 1 is a diagram illustrating an example system 100 capable of cryptographic block locking. The system 100 may include one or more devices, apparatuses, and/or components for performing operations described herein (e.g., for cryptographic block locking). For example, the system 100 may include a host device 110 and a storage system 120. The storage system 120 may include a system controller 130 and a memory device 140. The host device 110 may communicate with the storage system 120 (e.g., the system controller 130 of the storage system 120) via a host interface 150. The system controller 130 and the memory device 140 may communicate via an input/output (I/O) interface 160.

The system 100 may be any electronic device configured to store data in memory. For example, the system 100 may be a computer, a mobile phone, a wired or wireless communication device, a network device, a server, and/or an Internet of Things (IoT) device. The host device 110 may include one or more processors configured to execute instructions and store data in the memory device 140. For example, the host device 110 may include a central processing unit (CPU), a graphics processing unit (GPU), a field-programmable gate array (FPGA), an application-specific integrated circuit (ASIC), and/or a controller.

The storage system 120 may be any electronic device configured to store data in memory. In some implementations, the storage system 120 may be an electronic device configured to store data persistently in non-volatile memory. For example, the storage system 120 may be a hard drive, a solid-state drive (SSD), a flash memory device (e.g., a NAND flash device), a universal serial bus (USB) thumb drive, a memory card (e.g., a secure digital (SD) card), a secondary storage device, and/or an embedded multimedia card (eMMC) device.

The system controller 130 may be any device configured to communicate with the host device (e.g., via the host interface 150) and the memory device 140 (e.g., via the I/O interface 160) and/or configured to control operations of the storage system 120. For example, the system controller 130 may include an ASIC, an FPGA, a processor, and/or a controller.

The memory device 140 may be a non-volatile memory device configured to maintain data stored in memory after the memory device 140 is powered off (e.g., configured for persistent data storage). In some implementations, the memory device 140 is a NAND memory device. Although some techniques are described herein in connection with NAND memory devices, in some implementations, one or more of these techniques may be performed in connection with other types of non-volatile memory devices, such as NOR memory devices.

The system controller 130 may transmit a command to the memory device 140 based on an instruction received from the host device 110. The command may be, for example, a read command, a write command (sometimes called a program command), or an erase command. Additionally, or alternatively, the command may indicate the data to be read, written, or erased, and/or may indicate a location (e.g., in memory) for the data to be read, written, or erased. In some implementations, the system controller 130 may transmit, to the memory device 140, a cryptographic signature associated with the command. The system controller 130 may generate the cryptographic signature based on, for example, the command (e.g., generated based on the instruction received from the host device 110), a cryptographic key (e.g., a private key or a secret key stored by the system controller 130), and/or a monotonic counter value. The cryptographic key may be stored by the system controller 130 and by the memory device 140 and may not be shared with other devices (e.g., other than the system controller 130 and the memory device 140). The monotonic counter value may be stored by the system controller 130 and by the memory device 140. In some implementations, the cryptographic signature may be generated (e.g., by the system controller 130) by applying a hash-based message authentication code (HMAC) function or algorithm to the command, the cryptographic key, and the monotonic counter value.

The memory device 140 may verify the cryptographic signature prior to executing the command. If the memory device 140 verifies the cryptographic signature (e.g., by generating a matching signature), then the memory device 140 may process and/or perform the command. If the memory device 140 fails to verify the cryptographic signature (e.g., by generating a corresponding signature that does not match the cryptographic signature), or if the memory device 140 does not receive a cryptographic signature in connection with a command that requires a cryptographic signature (e.g., a security command), then the memory device 140 may refrain from processing and/or performing the command. The terms "first cryptographic signature" and "second cryptographic signature" may be used herein to differentiate between the cryptographic signature generated by the system controller 130 (and transmitted from the system controller 130 to the memory device 140) and the cryptographic signature generated by the memory device 140 (to which the cryptographic signature received from the system controller 130 is compared).

For example, the memory device 140 may generate a corresponding signature based on the same inputs used by the system controller 130 to generate the cryptographic signature, such as the command (received from the system controller 130), the cryptographic key (stored by the memory device 140), and the monotonic counter value (e.g., stored by the memory device 140). Thus, the memory device 140 and the system controller 130 may separately store the cryptographic key and may separately store the monotonic counter value, which may be modified (e.g., incremented) after each command is received, processed, and/or performed. In this way, each command is associated with a unique cryptographic signature (e.g., different from other commands), thereby increasing security.

As indicated above, FIG. 1 is provided as an example. Other examples may differ from what is described with regard to FIG. 1.

Figure 2:
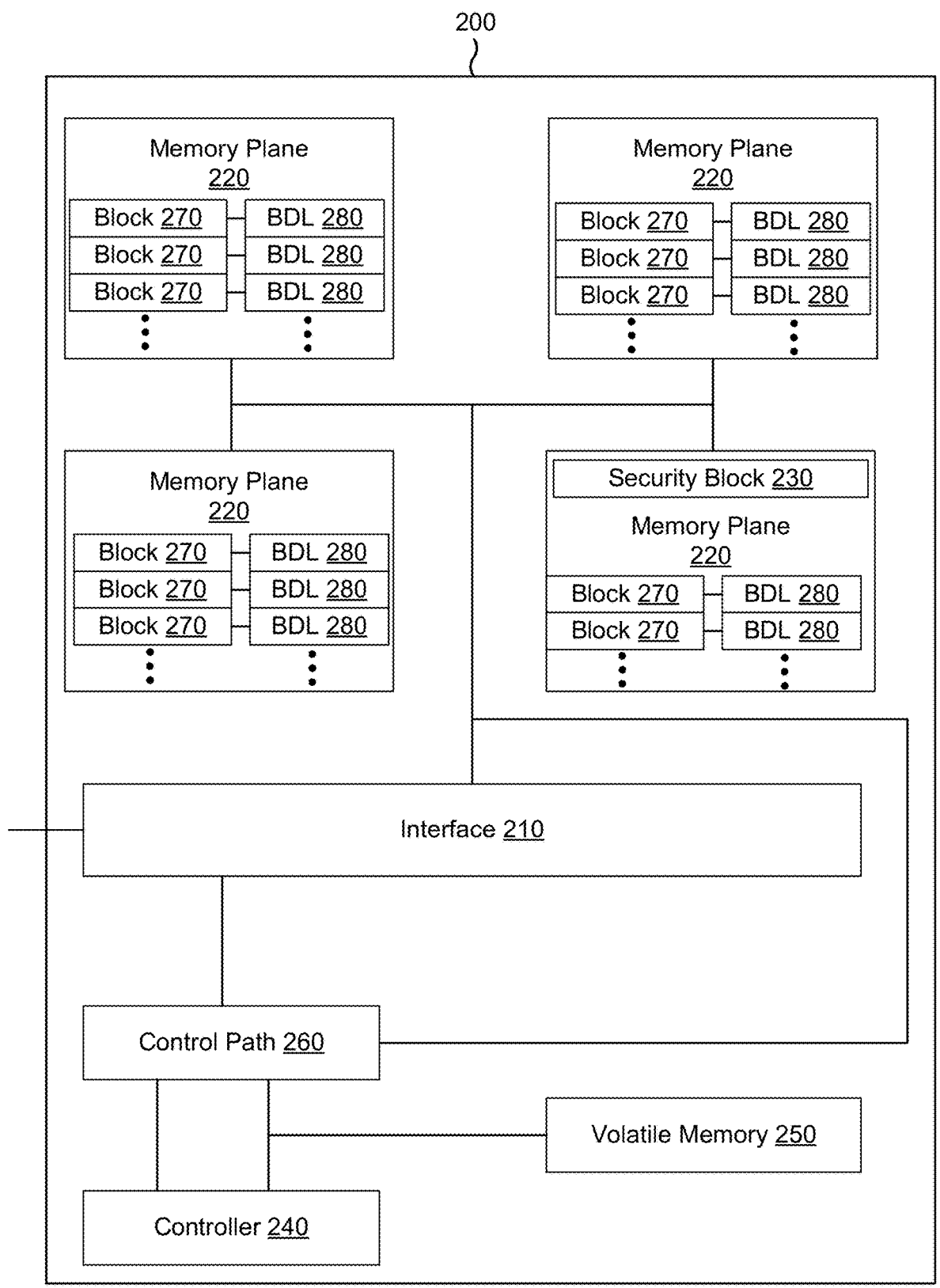
FIG. 2 is a diagram illustrating an example device capable of cryptographic block locking.

FIG. 2 is a diagram illustrating an example device 200 capable of cryptographic block locking. In some implementations, the device 200 is the memory device 140 described above in connection with FIG. 1. As shown, the device 200 may include an interface 210, one or more memory planes 220, a security block 230, a controller 240, a volatile memory 250, a control path 260, multiple blocks 270 (e.g., memory blocks), and/or multiple block disable latches (BDLs) 280.

The interface 210 may include one or more components configured to receive data from a device external from the device 200 (e.g., the system controller 130) and transmit the data to a component internal to the device 200 (e.g., a memory plane 220, the controller 240, the volatile memory 250, and/or the control path 260), or vice versa. For example, the interface 210 may include physical components (e.g., bond pads, contact pads, wires, metallic components, and/or electrically conductive components) that connect with and/or interface with the system controller 130. Additionally, or alternatively, the interface 210 may include one or more components configured to receive data from a first component internal to the device 200 (e.g., a memory plane 220) and transmit the data to a second component internal to the device 200 (e.g., the controller 240, the volatile memory 250, and/or the control path 260), or vice versa. In some implementations, the interface 210 may be configured to convert from a first data rate and/or a first data format to a second data rate and/or a second data format. For example, the interface 210 may include one or more data buffers and/or one or more data registers for storing data to convert between different data rates or different data formats.

A memory plane 220 is a memory component described in more detail in connection with FIG. 3. A memory plane 220 may be disposed on a die and may include multiple memory blocks 270. A memory block 270 (sometimes called a "block") is a memory component described in more detail in connection with FIG. 3. One of the blocks 270 (or more than one of the blocks) may be designated as a security block 230. The security block 230 may store security data. The security block 230 may be a reserved block or a dedicated block configured to store only the security data (and not, for example, user data). For example, the security block 230 may be inaccessible to a host device, and the security block 230 may only be accessible by a controller 240 and/or other components internal to the device 200. In some implementations, a block address of the security block 230 may not exist in an address space accessible by the host device. The security data may include data relating to cryptographic block locking. Additionally, or alternatively, the security data may include a cryptographic key (e.g., used to generate a cryptographic signature as described above in connection with FIG. 1), a monotonic counter value (e.g., used to generate a cryptographic signature as described above in connection with FIG. 1), and/or a block lock record that indicates access restrictions for individual memory blocks 270 (e.g., a read restriction, a write restriction, and/or an erase restriction). In some implementations, the security data is used only internally by the device 200, and the security data is not accessible by a device external from the device 200. The security block 230 may include one or more pages, as described in more detail in connection with FIG. 3. Although the device 200 is shown as including four memory planes 220, the device 200 may include a different quantity of memory planes 220.

The controller 240 may include one or more components configured to perform operations associated with cryptographic block locking. Additionally, or alternatively, the controller 240 may include one or more components configured to determine whether to enable or disable access to a block 270. For example, the controller 240 may receive a command and a first cryptographic signature and may generate a second cryptographic signature (e.g., based on the command, a cryptographic key stored in the security data, and a monotonic counter value stored in the security data). The controller 240 and/or the device 200 may enable access to a locked block if the first cryptographic signature is verified (e.g., if the first cryptographic signature matches the second cryptographic signature) and may disable access to the locked block if the first cryptographic signature is not verified (e.g., if the first cryptographic signature matches the second cryptographic signature).

The controller 240 may include, for example, one or more processors, a microcontroller, an ASIC, and/or an FPGA. In some implementations, a non-transitory computer-readable medium (e.g., volatile memory and/or non-volatile memory) may store a set of instructions (e.g., one or more instructions or code) for execution by the controller 240. The controller 240 may execute the set of instructions to perform one or more operations or methods described herein. For example, the controller 240 may execute firmware instructions stored in a memory plane 220 (e.g., in a read-only memory block of the memory plane 220), which may be loaded into volatile memory 250 for execution by the controller 240. Additionally, or alternatively, the controller 240 may execute one or more instructions received from the system controller 130 and/or the host device 110. In some implementations, execution of the set of instructions, by the controller 240, causes the controller 240 and/or the device 200 to perform one or more operations or methods described herein. In some implementations, hardwired circuitry is used instead of or in combination with the instructions to perform one or more operations or methods described herein. Additionally, or alternatively, the controller 240 and/or one or more components of the device 200 may be configured to perform one or more operations or methods described herein. Thus, implementations described herein are not limited to any specific combination of hardware circuitry and software.

The volatile memory 250 may include one or more components configured to store data. The volatile memory 250 may store the data only when the volatile memory 250 is powered on and may lose the data when the volatile memory 250 is powered off. For example, the volatile memory 250 may include one or more latches and/or random-access memory (RAM), such as SRAM or DRAM.

The control path 260 may include one or more components configured to transfer data between components internal to the device 200. For example, the control path 260 may include one or more components configured to permit or deny access between the interface 210 and one or more other components internal to the device 200 (e.g., a memory plane 220, the controller 240, and/or the volatile memory 250). Additionally, or alternatively, the control path 260 may include one or more components configured to permit or deny access to a memory plane 220 (e.g., based on an instruction or command from the controller 240).

A block 270 is a memory component described in more detail in connection with FIG. 3. In some implementations, a block 270 may be associated with a BDL 280. For example, a BDL 280 may enable or disable access to a block 270, as described in more detail elsewhere herein. In some implementations, each block 270 (e.g., including the security block 230) is associated with a corresponding BDL 280. A BDL 280 may include one or more components to enable or disable access to a corresponding block 270 based on one or more inputs to the BDL 280.

The quantity and arrangement of components shown in FIG. 2 are provided as an example. In practice, the device 200 may include additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) of the device 200 may perform one or more functions described as being performed by another set of components of the device 200.

Figure 3:
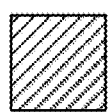
FIG. 3 is a diagram illustrating an example memory architecture that may be used by the device of FIG. 2 for cryptographic block locking.
Figure 3:
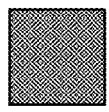
Figure 3:
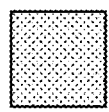
Figure 3:
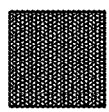
Figure 3:
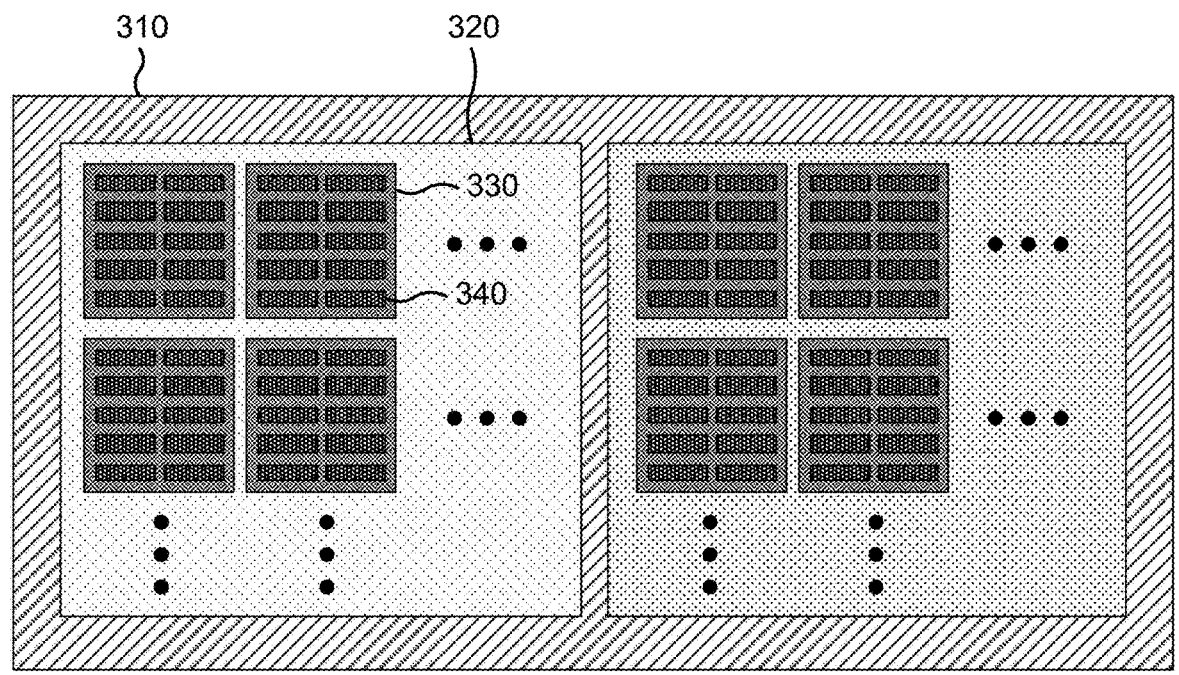
Figure 3:
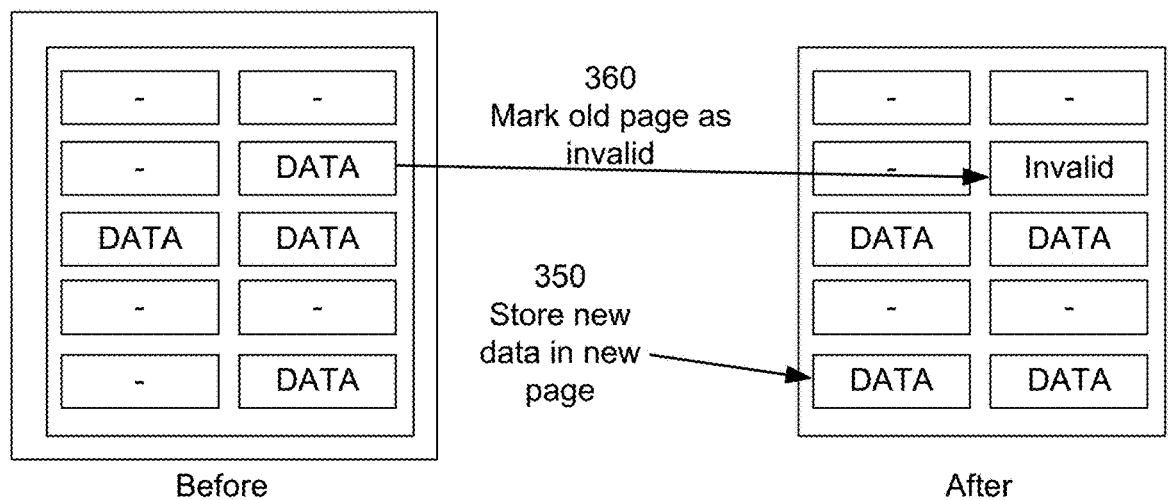

FIG. 3 is a diagram illustrating an example memory architecture 300 that may be used by the device 200 for cryptographic block locking. The device 200 may use the memory architecture 300 to store data. As shown, the memory architecture 300 may include a die 310, which may include multiple planes 320. A plane 320 may include multiple blocks 330. A block 330 may include multiple pages 340. Although FIG. 3 shows a particular quantity of planes 320 per die 310, a particular quantity of blocks 330 per plane 320, and a particular quantity of pages 340 per block 330, these quantities may be different than what is shown. In some implementations, the memory architecture 300 is a NAND memory architecture.

The die 310 is a structure made of semiconductor material, such as silicon. The device 200 may be fabricated on the die 310 (e.g., via a semiconductor device fabrication process). In some implementations, a die 310 is the smallest unit of memory that can independently execute commands. A memory chip or package may include one or more dies 310.

Each die 310 of a chip includes one or more planes 320. A plane 320 is sometimes called a memory plane. In some implementations, identical and concurrent operations can be performed on multiple planes 320 (sometimes with restrictions). Each plane 320 includes multiple blocks 330. A block 330 is sometimes called a memory block. Each block 330 includes multiple pages 340. A page 340 is sometimes called a memory page. A block 330 is the smallest unit of memory that can be erased. In other words, an individual page 340 of a block 330 cannot be erased without erasing every other page 340 of the block 330. A page 340 is the smallest unit of memory to which data can be written (i.e., the smallest unit of memory that can be programmed with data) and from which data can be read. The terminology "programming" memory and "writing to" memory may be used interchangeably. A page 340 may include multiple memory cells (sometimes called a string of memory cells) that are accessible via the same access line (sometimes called a word line).

In some implementations, read and write operations are performed for a specific page 340, while erase operations are performed for a block 330 (e.g., all pages 340 in the block 330). In some implementations, to prevent wearing out of memory, all pages 340 of a block 330 may be programmed before the block 330 is erased to enable a new program operation to be performed to a page 340 of the block 330. After a page 340 is programmed with data (called "old data" below), that data can be erased, but that data cannot be overwritten with new data prior to being erased. The erase operation would erase all pages 340 in the block 330, and erasing the entire block 330 every time that new data is to replace old data would quickly wear out the memory cells of the block 330. Thus, rather than performing an erase operation, the new data may be stored in a new page (e.g., an empty page), as shown by reference number 350, and the old page that stores the old data may be marked as invalid, as shown by reference number 360. The device 200 may then point operations associated with the data to the new page and may track invalid pages to prevent program operations from being performed on invalid pages prior to an erase operation. When the pages 340 of a block 330 are full (e.g., all or some threshold quantity of pages are either invalid or store valid data), the device 200 may copy the valid data (e.g., to a new block or to the same block after erasure) and may erase the block 330.

As indicated above, FIG. 3 is provided as an example. Other examples may differ from what is described with regard to FIG. 3.

Figure 4:
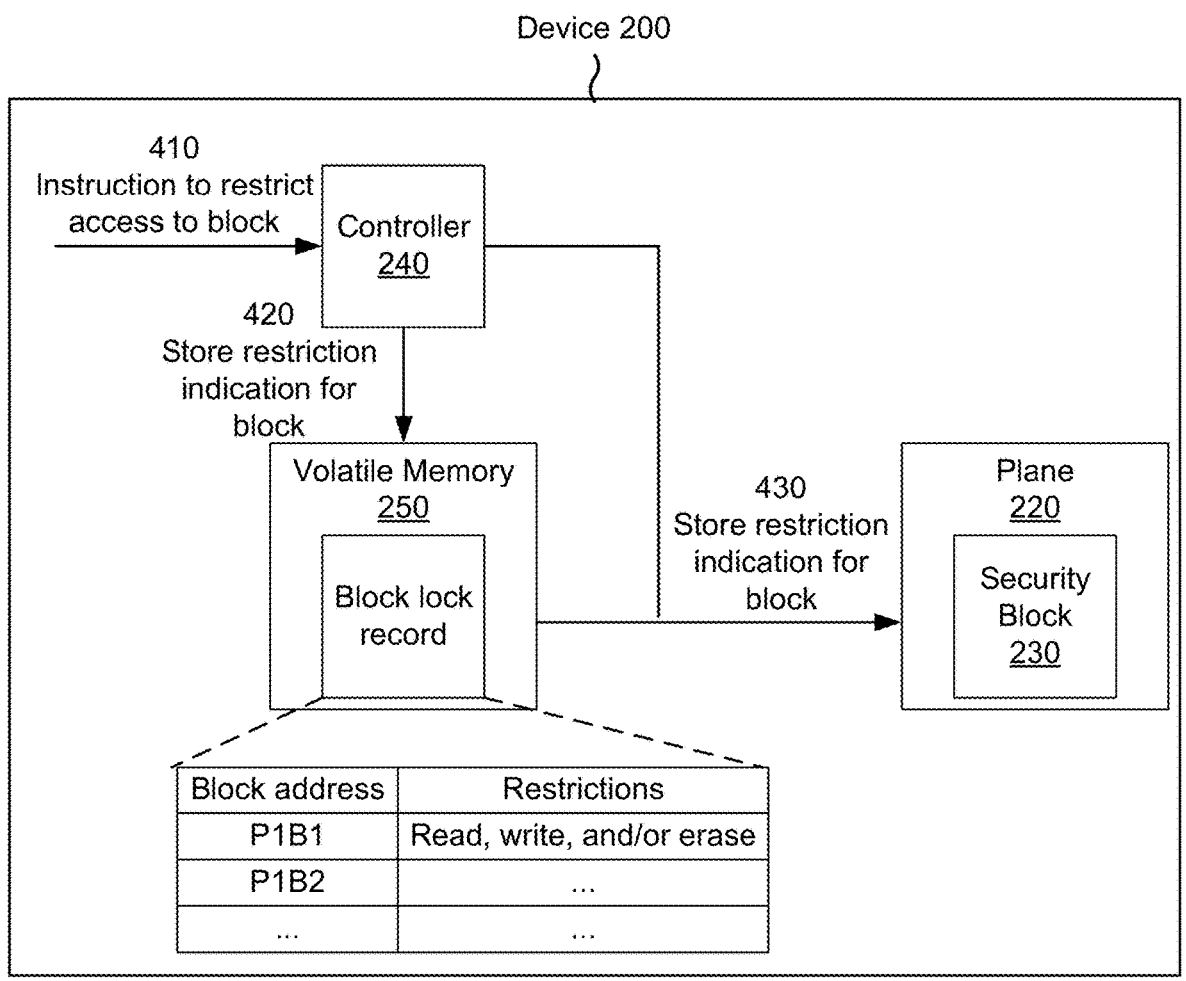
FIG. 4 is a diagram illustrating example operations associated with cryptographic block locking.

FIG. 4 is a diagram illustrating example operations associated with cryptographic block locking. The device 200 may perform one or more operations shown in FIG. 4 to restrict access to one or more blocks of memory (e.g., to lock one or more blocks) or to remove an access restriction from one or more blocks of memory (e.g., to unlock one or more blocks). In some implementations, one or more operations of FIG. 4 described as being performed by the device 200 may be performed by the controller 240.

As shown by reference number 410, the device 200 may receive an instruction to restrict access to a block (e.g., an individual block). The block may be one of multiple blocks of memory included in the device 200 (e.g., in one or more planes), as described above in connection with FIG. 3. In some implementations, the instruction may be received from the host device 110 via the system controller 130. In some implementations, the instruction may identify the block of memory for which access is to be restricted (e.g., using a block address). Alternatively, the instruction may generally indicate that access is to be restricted (e.g., for data to be stored by the device 200), and the device 200 may select a block for which access is to be restricted (e.g., may select a block to store the data for which access is to be restricted).

As shown by reference number 420 and reference number 430, the device 200 may store a restriction indication for the block, such as in volatile memory 250 and/or non-volatile memory (e.g., in a security block 230 of a plane 220). In some implementations, the device 200 may store the restriction indication in volatile memory 250, as indicated by reference number 420.

As shown, the restriction indication may be stored in a block lock record. The block lock record may include information that identifies a block, such as a block address or block identifier (shown as "P1B1" to represent block 1 of page 1, "P1B2" to represent block 2 of page 1, and so on). A block address may be an identifier (e.g., a physical identifier or a logical identifier) via which a block of memory can be accessed. In some implementations, the block lock record may also include a restriction indication for the block. The restriction indication for a block may indicate whether the block is associated with a read access restriction (e.g., indicating whether the block is locked for reading), a write access restriction (e.g., indicating whether the block is locked for writing, sometimes called a program access restriction that indicates whether the block is locked for programming), and/or an erase access restriction (e.g., indicating whether the block is locked for erasing). In some implementations, the device 200 may store separate restriction indications for each individual block, such as each individual block of multiple blocks of non-volatile memory, of a plane 220, of multiple planes 220, and/or of an array of non-volatile memory.

In some implementations, a restriction indication for a block may indicate whether access to the block is restricted for all command types (e.g., read, write, and erase). In this case, a first value of the restriction indication (e.g., 0) may indicate that access to the block is not restricted for any of the command types (e.g., is unlocked for read, write, and erase access), and a second value of the restriction indication (e.g., 1) may indicate that access to the block is restricted for all of the command types (e.g., is locked for read, write, and erase access). A restriction indication is sometimes referred to as a "block attribute."

Alternatively, the device 200 may store one or more command type-specific restriction indications for a block, such as a read restriction indication, a write restriction indication, and/or an erase restriction indication. A first value of the read restriction indication (e.g., 0) may indicate that read access to the block is not restricted, and a second value of the read restriction indication (e.g., 1) may indicate that read access to the block is restricted. Similarly, a first value of the write restriction indication (e.g., 0) may indicate that write access to the block is not restricted, and a second value of the write restriction indication (e.g., 1) may indicate that write access to the block is restricted. Similarly, a first value of the erase restriction indication (e.g., 0) may indicate that erase access to the block is not restricted, and a second value of the erase restriction indication (e.g., 1) may indicate that erase access to the block is restricted.

If access to a block is restricted for a command, then the device 200 may refrain from executing the command unless a cryptographic signature received in connection with the command is verified. If access to a block is not restricted for a command, then the device 200 may execute the command regardless of whether the command is accompanied by a cryptographic signature and/or regardless of whether the cryptographic signature is verified. Additional details regarding a format for storing restriction indications are described below in connection with FIG. 5.

As shown by reference number 430, the device 200 may store the restriction indication for the block in non-volatile memory, such as in the security block 230. For example, the device 200 may store the restriction indication in the volatile memory 250, and the device 200 may then copy the restriction indication to the security block 230 (e.g. via the control path 260), such as by writing security data, updated with the restriction indication, to a new page of the security block 230. Thus, a block lock record may be stored in both volatile memory 250 and non-volatile memory. The block lock record stored in volatile memory 250 may be used to perform security operations associated with incoming commands while the device 200 is powered on. However, data stored in volatile memory 250 is lost when the device 200 is powered off. Thus, the block lock record may be stored in non-volatile memory (e.g., in the security block 230) for persistent storage.

In some implementations, the device 200 may store the restriction indication based on cryptographically verifying the instruction. For example, the device 200 may receive a cryptographic signature associated with the command (e.g., in connection with the instruction and/or accompanying the instruction). If the device 200 verifies the cryptographic signature (e.g., by comparing the received cryptographic signature to another cryptographic signature generated by the device 200 using, for example, the instruction, a cryptographic key, and a monotonic counter value), then the device 200 may store the restriction indication. If the device 200 fails to verify the cryptographic signature, then the device 200 may refrain from storing the restriction indication and may discard the instruction. In some implementations, the device 200 may transmit a notification (e.g., to the system controller 130 and/or the host device 110) indicating that the instruction could not be cryptographically verified.

Similarly, the device 200 may receive an instruction to modify a stored restriction indication and may receive a cryptographic signature associated with the instruction. The device 200 may attempt to cryptographically verify the instruction (e.g., by performing a cryptographic signature comparison, as described elsewhere herein). If the device 200 cryptographically verifies the instruction, then the device 200 may modify the stored restriction indication based on the instruction (e.g., in volatile memory 250 and/or non-volatile memory). If the device 200 fails to verify the instruction, then the device 200 may refrain from modifying the stored restriction indication and may discard the instruction. In some implementations, the device 200 may transmit a notification (e.g., to the system controller 130 and/or the host device 110) indicating that the instruction could not be cryptographically verified. As described above, the restriction indication may be stored in volatile memory 250 and/or non-volatile memory.

By storing restriction indications for individual blocks, the device enables individual blocks of memory (e.g., non-volatile memory, such as NAND memory) to be locked or unlocked in a secure manner. Locking or unlocking individual blocks of memory enables more flexibility in data storage and data security. For example, sensitive data or more important data may be stored in a locked block, and non-sensitive data or less important data may be stored in an unlocked block. By individually locking or unlocking blocks, data stored in locked blocks can be secured, while data stored in unlocked blocks can be accessed faster.

As indicated above, FIG. 4 is provided as an example. Other examples may differ from what is described with regard to FIG. 4.

Figure 5:
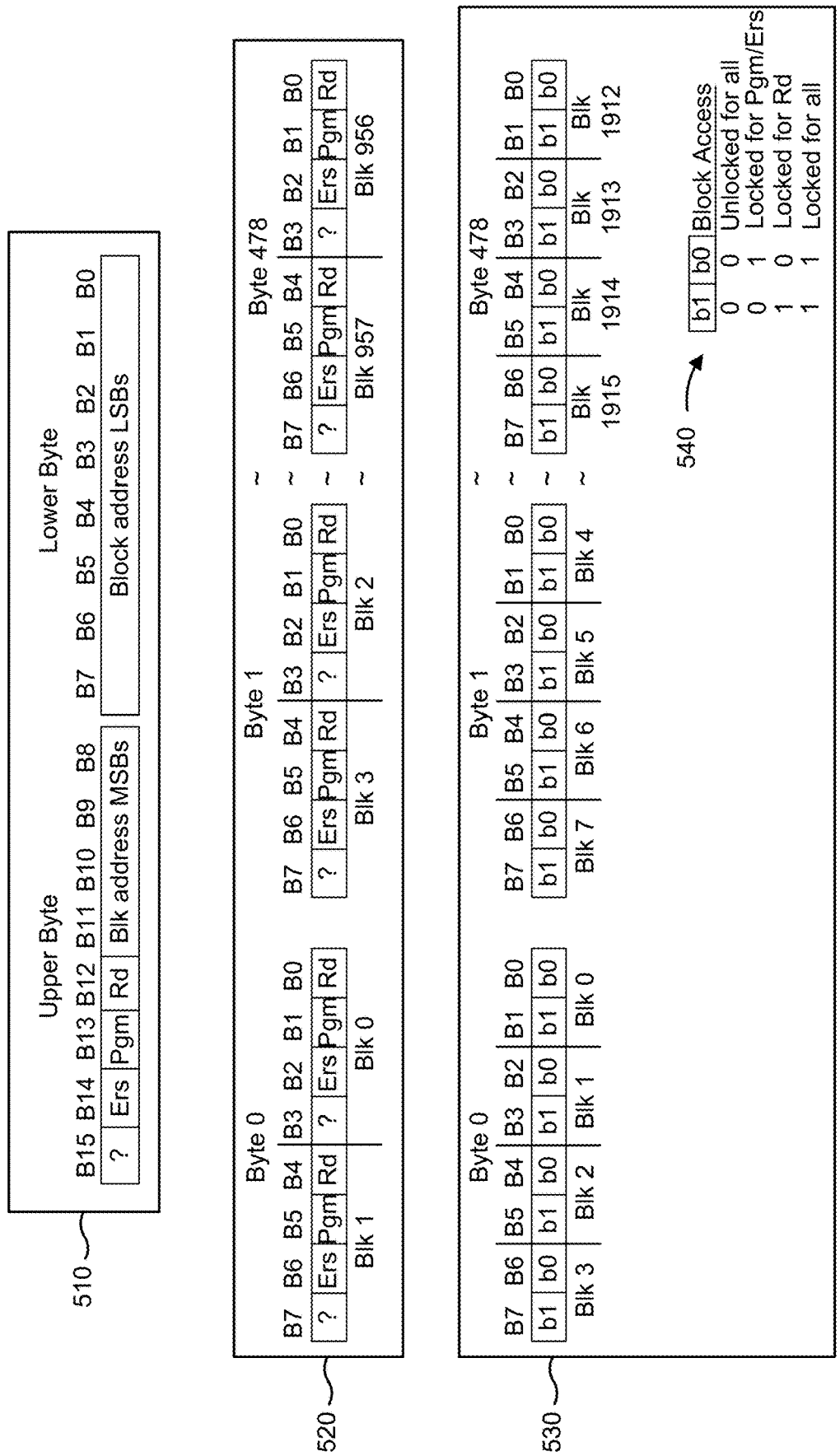
FIG. 5 is a diagram illustrating example data formats for storing restriction indications for cryptographic block locking.

FIG. 5 is a diagram illustrating example data formats for storing restriction indications for cryptographic block locking. FIG. 5 shows a first data format 510, a second data format 520, and a third data format 530. Each data format provides a different manner to store an indication of a block address and one or more restriction indications for a block having that block address. One or more of these data formats (or other data formats) may be used by the device 200 to store separate sets of restriction indications for different blocks in a block lock record.

Using the first data format 510, the device 200 may store an explicit indication of a block address of a block. In this case, the block address may occupy a quantity of bits, such as 12 bits as shown in FIG. 5 (shown as bits B0 through B11). Furthermore, using the first data format 510, a single bit (shown as bit B12) may be used to indicate a value of a read restriction indication (shown a "Rd"), a single bit (shown as bit B13) may be used to indicate a value of a write restriction indication (shown as "Pgm"), and a single bit (shown as bit B14) may be used to indicate a value of an erase restriction indication (shown as "Ers"). In some implementations, a single bit (shown as bit B15) may be reserved (shown as "?"). In this example, two bytes are used to indicate every type of access restriction for a particular block. In the illustrated two bytes, a first byte (shown as an "Upper Byte") is configured to store four bits (the four most significant bits, or MSBs) of the block address, and a second byte (shown as a "Lower Byte") is configured to store eight bits (the eight least significant bits, or LSBs) of the block address. In some cases, if the device 200 stores block attributes (e.g., restriction indications) only for blocks to which a restriction indication applies (e.g., only to locked blocks), then the first data format 510 may conserve memory resources as compared to the second data format 520 and/or the third data format 530, such as if only a small number of blocks have access restrictions. In some cases, the first data format 510 may be easier to implement (e.g., in a circuit design) than the second data format 520 and/or the third data format 530.

Using the second data format 520, the device 200 may store an implicit indication of the block address of a block. For example, different logical memory positions, in which restriction indications are stored, may correspond to different blocks and/or block addresses. In the second data format 520, and as an example, four bits are reserved for a block, with three of those bits being used to indicate a set of restriction indications for the block, and the fourth bit being a reserved bit. The set of restriction indications include a read restriction indication, a write or program restriction indication, and an erase restriction indication.

As an example of the second data format 520, bits B0 through B3 of Byte 0 correspond to a block identified as Block 0 (shown as "Blk 0"). Bit B0 stores a read restriction indication for Block 0, bit B1 stores a write restriction indication for Block 0, bit B2 stores an erase restriction indication for Block 0, and bit B3 is reserved. Similarly, bits B4 through B7 of Byte 0 store restriction indications for Block 1, bits B0 through B3 of Byte 1 store restriction indications for Block 2, bits B4 through B7 of Byte 1 store restriction indications for Block 3, and so on. Using this data format, each byte of memory stores two sets of restriction indications, with each set of restriction indications corresponding to a different block. Thus, using the second data format 520, a restriction indication may be stored without a block address being explicitly stored, and a logical memory position of the restriction indication may indicate a corresponding block to which the restriction indication applies. In some implementations, the second data format 520 may conserve memory resources as compared to the first data format 510 because the second data format 520 does not use any bits for an explicit indication of a block address. The second data format 520 consumes more memory resources but allows for more flexibility in locking or unlocking blocks for different combinations of read, write, and/or erase as compared to the third data format 530.

Using the third data format 530, the device 200 may also store an implicit indication of the block address of a block, in a similar manner as described above in connection with the second data format 520. In the third data format 530, and as an example, two bits are reserved for a block (shown as "b1" and "b0"), and different bit combinations of those two bits correspond to different restriction indications. For example, and as shown by reference number 540, a bit combination of "00" for b1 and b0 indicates that a corresponding block is unlocked for all access restrictions (e.g., is unlocked for reading, writing, and erasing). As another example, a bit combination of "01" for b1 and b0 indicates that a corresponding block is locked for both writing and erasing (and is unlocked for reading). As another example, a bit combination of "10" for b1 and b0 indicates that a corresponding block is locked for reading (and is unlocked for both writing and erasing). As another example, a bit combination of "11" for b1 and b0 indicates that a corresponding block is locked for all access restrictions (e.g., is locked for reading, writing, and erasing).

As an example of the third data format 530, bits B0 and B1 of Byte 0 correspond to a block identified as Block 0 (shown as "Blk 0"), where bit B0 indicates a value of b0 for Block 0 and bit B1 indicates a value of b1 for Block 0. Similarly, bits B2 and B3 of Byte 0 correspond to Block 1, where bit B2 indicates a value of b0 for Block 1 and bit B3 indicates a value of b1 for Block 1, and so on. Using this data format, each byte of memory stores four sets of restriction indications, with each set of restriction indications corresponding to a different block. Thus, using the third data format 530, like the second data format 520, a restriction indication may be stored without a block address being explicitly stored, and a logical memory position of the restriction indication may indicate a corresponding block to which the restriction indication applies. In some implementations, the third data format 530 may conserve memory resources as compared to the first data format 510 and the second data format 520, but the third data format 530 may not be as flexible as the second data format 520.

As indicated above, FIG. 5 is provided as an example. Other example data formats may differ from what is described with regard to FIG. 5.

Figure 6:
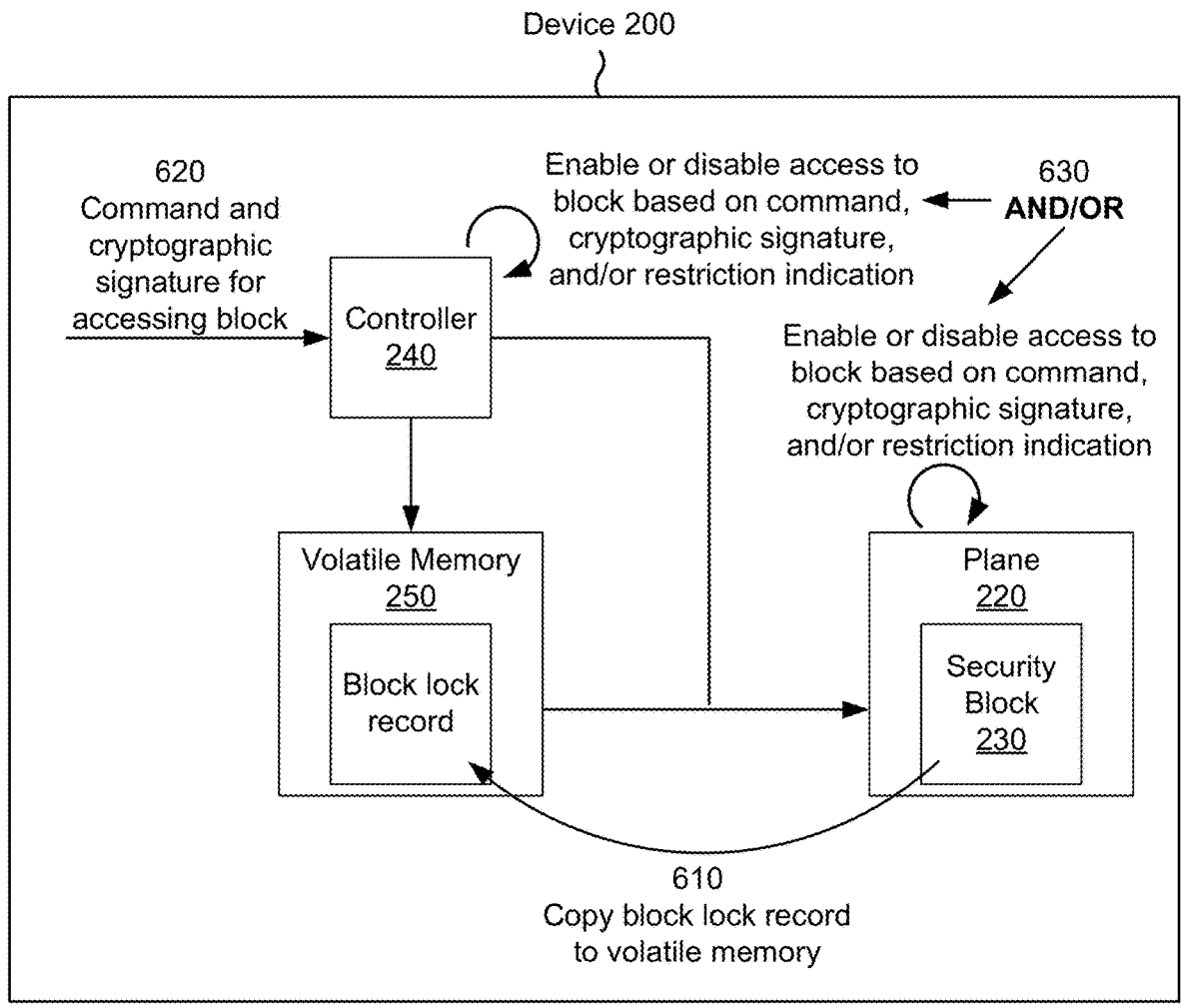
FIGS. 6-10 are diagrams illustrating example operations associated with cryptographic block locking.

FIG. 6 is a diagram illustrating example operations associated with cryptographic block locking. The device 200 may perform one or more operations shown in FIG. 6 to apply a restriction indication for a block when a command to access that block is received. Based on the restriction indication, the command, and/or a cryptographic signature received in connection with the command, the device 200 may enable or disable access to the block associated with the command. In some implementations, one or more operations of FIG. 6 described as being performed by the device 200 may be performed by the controller 240.

As shown by reference number 610, the device 200 may copy a block lock record from non-volatile memory to volatile memory 250. For example, as described above in connection with FIG. 4, the device 200 may store and/or update a block lock record that includes separate restriction indications for each individual block (e.g., of multiple blocks, of a plane 220, of multiple planes 220, and/or of non-volatile memory of the device 200). The block lock record may be stored in volatile memory 250 and non-volatile memory (e.g., in the security block 230 of a plane 220). If the device 200 and/or the volatile memory 250 is powered off, then the block lock record stored in the volatile memory 250 is lost. Later, upon power up and/or initialization, the device 200 may obtain the block lock record stored in the non-volatile memory (e.g., in the security block 230), and may copy that block lock record to the volatile memory 250. In this way, the device 200 may operate using the block lock record in volatile memory 250 with reduced latency (e.g., lower access times) as compared to operating using the block lock record in non-volatile memory. If the device 200 is not powered off after the block lock record has last been stored or updated (e.g., as described in connection with FIG. 4), then the block lock record may already be stored in the volatile memory 250 and need not be copied from the non-volatile memory to operate using a block lock record stored in the volatile memory 250.

As shown by reference number 620, the device 200 may receive a command and/or a cryptographic signature for accessing a block, such as an individual block of memory (e.g., one of multiple blocks of memory of the non-volatile memory, of a plane 220, of multiple planes 220, or of a memory array of the non-volatile memory). For example, the device 200 may receive a command that identifies an individual block to be accessed. The command may identify the block using, for example, a block address, an address sequence (e.g., a plane identifier, a block identifier, and a byte number of the block), or another type of block identifier. The command may indicate a command type for the command, such as a read command type, a write (or program) command type, or an erase command type. In some implementations, the command may include data, such as for a write command where data is to be written to the block.

In some implementations, the device 200 may receive a cryptographic signature associated with the command. For example, the cryptographic signature may be included in the command, may accompany the command (e.g., may be received within a threshold amount of time of receiving the command), may be received immediately prior to or subsequent to the command (e.g., with no intervening commands and/or messages), may be included in a same message as the command, may include a command identifier that identifies the command to which the cryptographic signature corresponds, or may otherwise be associated with the command. In some implementations, a command may not be associated with or be accompanied with a cryptographic signature (e.g., if the command requests access to an unlocked block or indicates a command type that is not locked for the block).

As shown by reference number 630, the device 200 may enable or disable access to the individual block based on the command, the cryptographic signature, and/or one or more restriction indications associated with the individual block. In some implementations, the controller 240 may enable or disable the access. Additionally, or alternatively, a block disable latch may enable or disable the access, as described in more detail in connection with FIGS. 8-10. In some implementations, the controller 240 may enable or disable access to the block without using a block disable latch. In some implementations, the controller 240 and a block disable latch may operate together to enable or disable access to the block.

As an example, if a restriction indication for the block indicates that the block is not locked for any command types, then the device 200 may enable access to the block and/or may execute the command, regardless of whether the command is accompanied by a cryptographic signature and/or regardless of whether such a cryptographic signature (if received) is verified. As another example, if a restriction indication for the block indicates that the block is not locked for a specific command type indicated by the command, then the device 200 may enable access to the block and/or may execute the command, regardless of whether the command is accompanied by a cryptographic signature and/or regardless of whether such a cryptographic signature (if received) is verified.

As another example, if a restriction indication for the block indicates that the block is locked, either for all command types or for a specific command type indicated by the command, then the device 200 may verify a cryptographic signature associated with the command. If the command is not associated with and/or accompanied by a cryptographic signature, then the device 200 may disable access to the block and/or may refrain from executing the command. If the command is associated with a cryptographic signature and the device 200 fails to verify the cryptographic signature (e.g., determines that the cryptographic signature is invalid or not verified), then the device 200 may disable access to the block and/or may refrain from executing the command. If the command is associated with a cryptographic signature and the device 200 verifies the cryptographic signature (e.g., determines that the cryptographic signature is valid or verified), then the device 200 may enable access to the block and/or may execute the command. Details of verifying a cryptographic signature are described elsewhere herein.

In this way, the device 200 and/or one or more components thereof (e.g., the controller 240 and/or one or more block disable latches) are capable of and/or configured to separately restrict access to each individual block of multiple blocks included in, for example, non-volatile memory, a plane of non-volatile memory, or multiple planes of non-volatile memory (e.g., NAND memory). Locking or unlocking individual blocks of memory enables more flexibility in data storage and data security, enables sensitive data or more important data may be stored in a locked block for increased security while non-sensitive data or less important data is stored in an unlocked block for faster access.

In some implementations, such as during a default mode of operation, the device 200 may receive a separate cryptographic signature with each command, at least for commands to access locked blocks. For example, the device 200 may receive a first cryptographic signature in connection with a first command, may receive a second cryptographic signature in connection with a second command, may receive a third cryptographic signature in connection with a third command, and so on. In this implementation (e.g., when operating using the default mode), the device 200 may use a cryptographic signature to verify only a single command, and the device 200 may execute only that single command (and not any other commands) if the cryptographic signature is verified. If a second command is received at a later time, the previously verified cryptographic signature, used to verify a previous command, cannot be used for verification of the second command. Instead, the second command must be accompanied by a separate cryptographic signature that accompanies the second command. Thus, the determination of whether to enable or disable access to a block may be made separately by the device 200. In other words, the device 200 is configured to enable or disable access to a block, for each command, based on a corresponding cryptographic signature received in connection with that command. In some implementations, the device 200 only operates in this manner (e.g., the default mode). Alternatively, the device 200 may implement a temporary access mode, as described below.

In a temporary access mode, the device 200 may receive (e.g., from the host device 110 and/or the system controller 130) an instruction to enable access to a block for multiple commands (sometimes called "multiple command access"). The instruction or an initial command, of the multiple commands, may be accompanied by a cryptographic signature. If the block is locked and the device 200 verifies the cryptographic signature, then the device 200 may enable access to the block for multiple commands (e.g., as opposed to requiring a separate cryptographic signature for each command, as described above in connection with the default mode). In some implementations, the device 200 may store an indication (e.g., in volatile memory 250) that multiple command access is enabled. Then, upon receiving one or more subsequent commands for the block, the device 200 may enable access to the block for those one or more subsequent commands based on previously verifying the cryptographic signature and/or based on the stored indication that multiple command access is enabled. In some implementations, the device 200 may be configured to operate in the default mode unless access to the block has been enabled (e.g., temporarily enabled) for multiple commands. In other words, the device 200 may be configured to enable or disable access to a block, for each command, based on a corresponding cryptographic signature received in connection with that command unless access to the block has been enabled for multiple commands.

In some implementations, the device 200 may be triggered to switch from operating in the temporary access mode to operating in the default mode. For example, if the device 200 is powered off while operating in the temporary access mode, then the device 200 may return to operating in the default mode upon power up. In some implementations, a bit stored in memory (e.g., volatile memory 250) may indicate whether to operate in the default mode or the temporary access mode, and that bit may be set, upon initialization of the device 200, to indicate to operate in the default mode. Thus, powering up or powering down of the device 200 may trigger a switch from the temporary access mode to the default mode.

As another example, the device 200 may receive an instruction (e.g., from the host device 110 and/or the system controller 130) to disable access to the block of memory for multiple commands (e.g., for one or more subsequent commands) after receiving the instruction to switch to the temporary access mode. In other words, the device 200 may receive an instruction to operate using the default mode. Based on receiving this instruction, the device 200 may store an indication (e.g., in volatile memory 250) that multiple command access is disabled. Upon receiving a subsequent command to access the block, the device 200 may disable access to the block unless the command is associated with a verified cryptographic signature.

As another example, the device 200 may receive a command that identifies a different block than the block associated with the multiple commands. In some implementations, this may trigger the device 200 to disable multiple command access. In this example, multiple command access may be enabled for only a single block at a time (and not on a per-block basis). This may increase security by preventing a malicious attempt to include an intervening command, amidst multiple commands associated with a particular block, to attempt to gain unauthorized access to a different block. In this case, the device 200 may require verification of a cryptographic signature associated with the intervening command in order to enable access to the different block. Alternatively, reception of a command that identifies a different block than a block associated with the multiple commands may signal that the multiple commands are finished, and that multiple command access can be disabled.

As indicated above, FIG. 6 is provided as an example. Other examples may differ from what is described with regard to FIG. 6.

Figure 7:
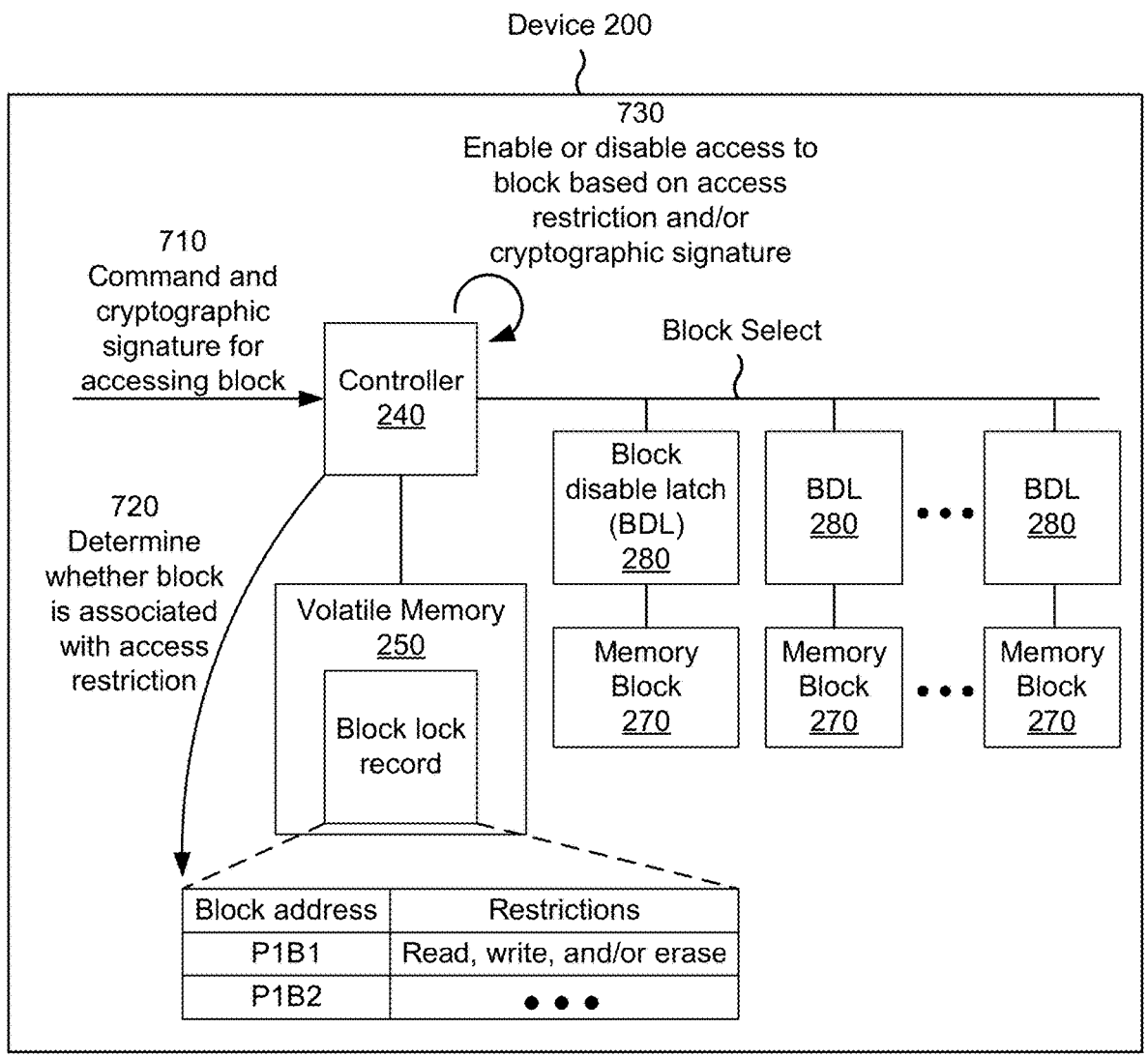

FIG. 7 is a diagram illustrating example operations associated with cryptographic block locking. The device 200 may perform one or more operations shown in FIG. 7 to apply a restriction indication for a block when a command to access that block is received. Based on the restriction indication, the command, and/or a cryptographic signature received in connection with the command, the device 200 may enable or disable access to the block associated with the command. In some implementations, one or more operations of FIG. 7 described as being performed by the device 200 may be performed by the controller 240.

As shown by reference number 710, the device 200 (e.g., the controller 240) may receive a command and/or a cryptographic signature for accessing a block, such as an individual block of memory (e.g., one of multiple blocks of memory of the non-volatile memory, of a plane 220, of multiple planes 220, or of a memory array of the non-volatile memory), as described above in connection with reference number 620 of FIG. 6. As described above in connection with FIG. 6, the command may indicate a block address that identifies a block for which the command requests access.

As shown by reference number 720, the device 200 (e.g., the controller 240) may determine whether the block is associated with an access restriction related to the command (e.g., that access to the block is restricted for all command types or for a command type of the command). For example, the device 200 may use the block address, associated with the command, to identify one or more restriction indications corresponding to the block address. In some implementations, the device 200 may look up the one or more restriction indications, in a block lock record, using the block address. For example, the device 200 may search for the block address in the block lock record (e.g., if the block lock record uses the first data format 510, described above in connection with FIG. 5), and may identify one or more access restrictions associated with that block address (e.g., stored in a first portion of a byte, where a second portion of the byte stores a portion of the block address). As another example, the device 200 may determine one or more logical memory positions corresponding to the block address, and the device 200 may identify one or more access restrictions stored in those logical memory positions (e.g., if the block lock record uses the second data format 520 or the third data format 530, described above in connection with FIG. 5). As described elsewhere herein, a restriction indication may indicate an access restriction for a block, such as a read access restriction, a write access restriction, or an erase access restriction.

As shown by reference number 730, the device 200 (e.g., the controller 240) may enable or disable access to the block based on whether the block of non-volatile memory is associated with an access restriction and/or based on the cryptographic signature. In some implementations, the controller 240 may enable access to the block by executing the command to cause a read operation, a write operation, or an erase operation to be performed on the block. In some implementations, the controller 240 may disable access to the block by refraining from executing (or by ignoring, dropping, or disregarding) the command to prevent a read operation, a write operation, or an erase operation from being performed on the block.

As an example, if the block is not associated with an access restriction, either for any command type or for a specific command type indicated by the command, then the controller 240 may enable access to the block regardless of whether the command is accompanied by a cryptographic signature and/or regardless of whether such a cryptographic signature (if received) is verified.

As another example, if the block is associated with an access restriction, either for all command types or for a specific command type indicated by the command, then the controller 240 may verify a cryptographic signature associated with the command. If the command is not associated with a cryptographic signature, then the controller 240 may disable access to the block. If the command is associated with a cryptographic signature and the controller 240 fails to verify the cryptographic signature (e.g., determines that the cryptographic signature is invalid or not verified), then the controller 240 may disable access to the block. If the command is associated with a cryptographic signature and the controller 240 verifies the cryptographic signature (e.g., determines that the cryptographic signature is valid or verified), then the controller 240 may enable access to the block.

In this way, the controller 240 is capable of separately restricting access to each individual block of multiple blocks included in, for example, non-volatile memory, a plane of non-volatile memory, or multiple planes of non-volatile memory (e.g., NAND memory). Locking or unlocking individual blocks of memory enables more flexibility in data storage and data security, enables sensitive data or more important data may be stored in a locked block for increased security while non-sensitive data or less important data is stored in an unlocked block for faster access. In some implementations, the controller 240 may be configured to operate in the default mode and/or the temporary access mode, and/or to switch between these modes based on a trigger, as described above in connection with FIG. 6.

As indicated above, FIG. 7 is provided as an example. Other examples may differ from what is described with regard to FIG. 7.

Figure 8:
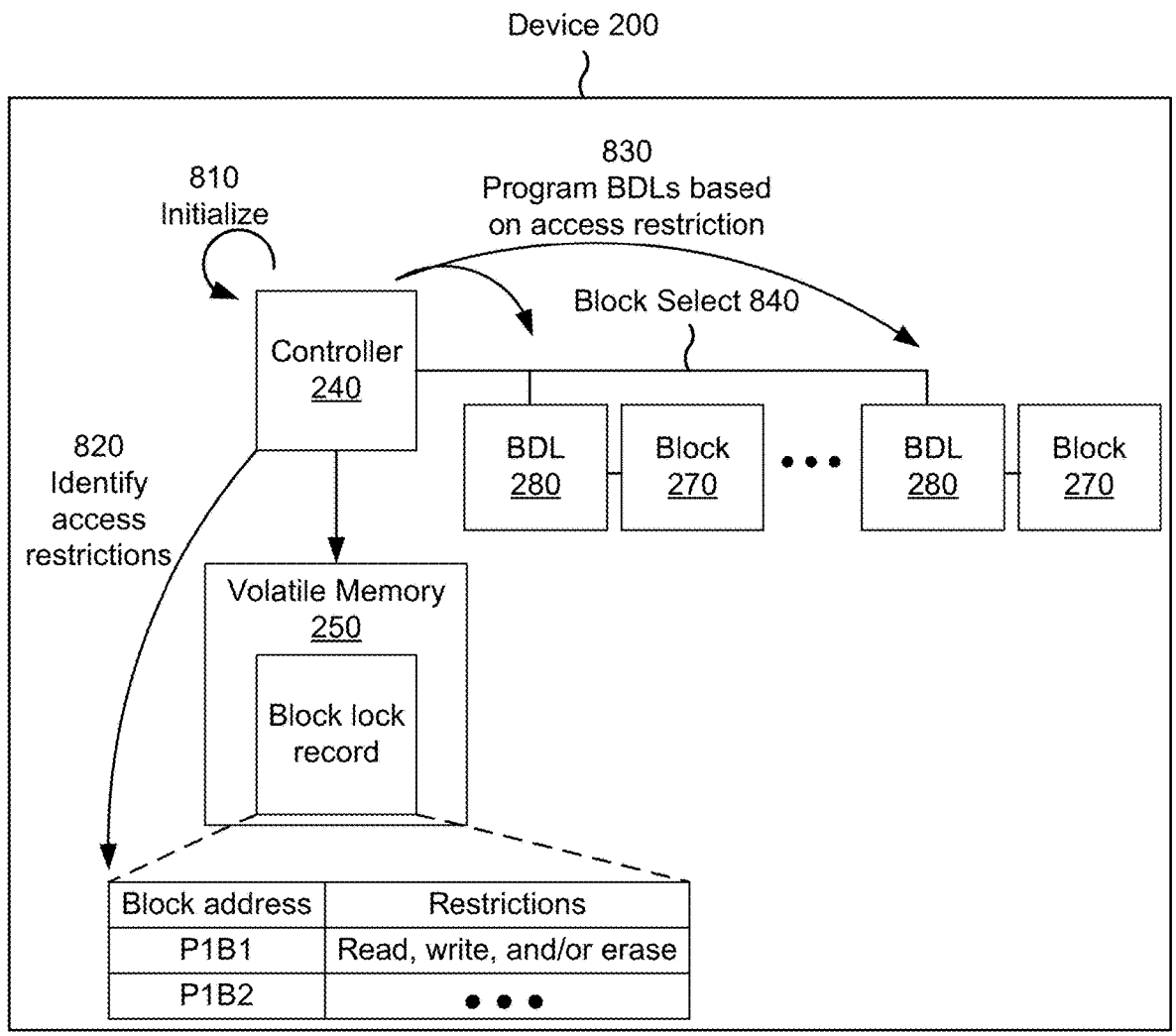

FIG. 8 is a diagram illustrating example operations associated with cryptographic block locking. The device 200 may perform one or more operations shown in FIG. 8 to initialize a set of BDLs 280 for restricting access to a corresponding set of blocks 270. In some implementations, one or more operations of FIG. 8 described as being performed by the device 200 may be performed by the controller 240.

As shown by reference number 810, the device 200 may perform an initialization procedure, such as prior to reading or writing any user data to non-volatile memory. For example, the device 200 may perform the initialization procedure based on receiving an initialization command from the host device 110 and/or the system controller 130. During initialization, the device 200 may read a read-only memory (ROM) block and perform one or more initialization operating (or boot-up operations) based on data in the ROM block, such as a trim operation (e.g., based on a TRIM command) or a repair operation. As part of the initialization procedure, the device 200 may program the BDLs 280 to control access to corresponding blocks 270.

For example, as shown by reference number 820, the device 200 (e.g., the controller 240) may identify one or more access restrictions. The device 200 may identify blocks to which those access restrictions correspond. As shown by reference number 830, the device 200 may program BDLs 280 that are associated with a corresponding block 270 that is associated with an access restriction.

In some implementations, the device 200 may use the block lock record to identify a set of blocks 270 associate with at least one access restriction. The device 200 may also identify one or more access restrictions (e.g., a global access restriction for all commands, a read access restriction, a write access restriction, and/or an erase access restriction) associated with each block 270 that has an access restriction. For each block 270 associated with an access restriction, the device 200 may program a corresponding BDL 280 to apply the access restriction.

For example, if a block 270 is associated with a read access restriction, then the device 200 may program a read lock circuit, of a BDL 280 capable of restricting access to the block 270, to store an indication of the read access restriction. Similarly, if a block 270 is associated with a write access restriction, then the device 200 may program a write lock circuit (or a program lock circuit), of a BDL 280 capable of restricting access to the block 270, to store an indication of the write access restriction. Similarly, if a block 270 is associated with an erase access restriction, then the device 200 may program an erase lock circuit, of a BDL 280 capable of restricting access to the block 270, to store an indication of the erase access restriction. In some implementations, the functionality of two or more of these lock circuits may be combined in a single lock circuit. For example, if write and erase access restrictions are combined, and a block 270 is associated with a write and erase access restriction, then the device 200 may program a write/erase lock circuit, of a BDL 280 capable of restricting access to the block 270, to store an indication of the write and erase access restriction. In some implementations, the controller 240 may program a BDL 280 by transmitting one or more signals via a block select bus 840 (e.g., to select a BDL 280 to be programmed) and/or a command bus (e.g., to send a command to program the selected BDL 280, not shown). Additional details regarding lock circuits and using a BDL 280 to restrict access to a block 270 are described below in connection with FIGS. 9 and 10.

As indicated above, FIG. 8 is provided as an example. Other examples may differ from what is described with regard to FIG. 8.

Figure 9:
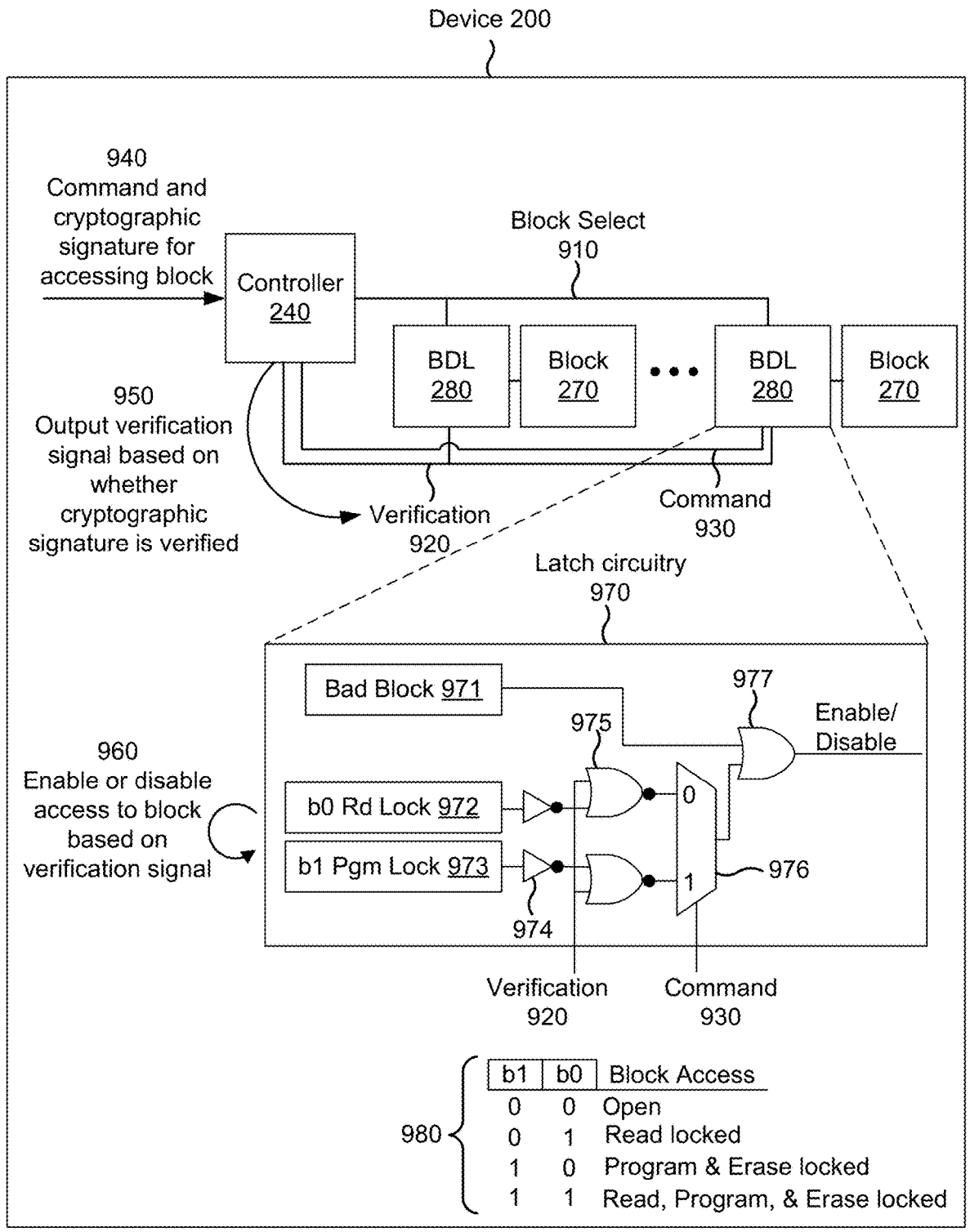

FIG. 9 is a diagram illustrating example operations associated with cryptographic block locking. The device 200 may perform one or more operations shown in FIG. 9 to apply a restriction indication for a block when a command to access that block is received. Based on the restriction indication, the command, and/or a cryptographic signature received in connection with the command, the device 200 may enable or disable access to the block associated with the command.

As shown in FIG. 9, the device 200 may include the controller 240 and one or more BDLs 280. Each BDL 280 may be considered a latch circuit. As further shown, the controller 240 may transmit signals to the BDLs 280 using a block select bus 910, a verification bus 920, and/or a command bus 930. For example, the controller 240 may use the block select bus 910 to select a BDL 280 (and corresponding block 270) to which a verification signal and/or a command signal is to be transmitted, may use the verification bus 920 to transmit a verification signal to the selected BDL 280, and may use the command bus 930 to transmit a command signal to the selected BDL 280 (e.g., based on the command received by the controller 240).

As shown by reference number 940, the device 200 (e.g., the controller 240) may receive a command and/or a cryptographic signature for accessing a block, such as an individual block of memory (e.g., one of multiple blocks of memory of the non-volatile memory, of a plane 220, of multiple planes 220, or of a memory array of the non-volatile memory), as described above in connection with reference number 620 of FIG. 6 and reference number 710 of FIG. 7.

As shown by reference number 950, the device 200 (e.g., the controller 240) may output a verification signal (e.g., via the verification bus 920) based on whether the cryptographic signature is verified. For example, if the controller 240 verifies the cryptographic signature, then the controller 240 may output the verification signal (or may output a first verification signal, which may be signaled using a first value or a first parameter). If the controller 240 fails to verify the cryptographic signature, then the controller 240 may refrain from outputting the verification signal (or may output a second verification signal, which may be signaled using a second value or a second parameter). Notably, in some implementations, the controller 240 need not determine whether the command is for a block associated with an access restriction because the controller 240. Rather, in the implementation of FIG. 9, the BDL 280 determines whether a corresponding block 270 is associated with an access restriction (based on a value stored in one or more lock circuits, as described below).

In some implementations, the device 200 (e.g., the controller 240) may output a command signal (e.g., via the command bus 930) to the BDL 280. The command signal may indicate the command type to be performed (read, write, or erase). In some implementations, multiple command types may be combined using a single value. For example, a first value (e.g., 1) may indicate a program or erase command type, and a second value (e.g., 0) may indicate a read command type. Alternatively, the command signal may indicate one of three or more values, such as a value indicating a read command type, a value indicating a program command type, and a value indicating an erase command type.

As shown by reference number 960, the device 200 (e.g., a BDL 280) may enable or disable access to a corresponding block 270 based on the verification signal. In some implementations, the BDL 280 to enable or disable access to a corresponding block 270 based on the verification signal, the command signal, and information stored in a lock circuit of the BDL 280. For example, if the information stored in the lock circuit indicates that the block 270 is not locked (e.g., for any command types or for a specific command type indicated by the command signal), then the BDL 280 may output an enable signal to enable the command to be performed for the block 270, regardless of a value of the verification signal. As another example, if the information stored in the lock circuit indicates that the block 270 is locked (e.g., for all command types or for a specific command type indicated by the command signal), and the verification signal indicates that the cryptographic signature is verified (e.g., the verification signal has a first value), then the BDL 280 may output an enable signal to enable the command to be performed for the block 270. As another example, if the information stored in the lock circuit indicates that the block 270 is locked (e.g., for all command types or for a specific command type indicated by the command signal), and the verification signal indicates that the cryptographic signature is not verified (e.g., the verification signal has a second value), then the BDL 280 may output a disable signal to prevent the command from being performed for the block 270.

In the example of FIG. 9, the BDL 280 includes latch circuitry 970. The latch circuitry 970 includes a bad block circuit 971, a read lock circuit 972, a program lock (or write lock) circuit 973, one or more inverters 974, one or more NOR logic gates 975, a multiplexer 976, and an OR logic gate 977. As shown, the output of a lock circuit may be provided as input to an inverter 974. The inverter 974 may flip or invert an input value and output the result (e.g., an inverter output) to a NOR logic gate 975. The NOR logic gate 975 may receive the inverter output and the verification signal, may perform a NOR operation on those inputs (e.g., based on a NOR logic gate truth table), and may output the result (e.g., a NOR logic gate output) to the multiplexer 976. The multiplexer 976 may receive multiple NOR logic gate outputs (e.g., from different NOR logic gates 975) and the command signal, and the multiplexer 976 may select a NOR logic gate output to be provided as a multiplexer output based on the value of the command signal. The selected output of the multiplexer 976 may be output to the OR logic gate 977, which may also receive an output of the bad block circuit 971. The OR logic gate 977 may perform an OR operation on those inputs (e.g., based on an OR logic gate truth table) and may output the result as either an enable signal (to enable the command to be operate on the block 270) or a disable signal (e.g., to prevent the command from being performed on the block 270).

As shown by reference number 980, if the block 270 is associated with a read access restriction, then the read lock circuit 972 may store a first value (e.g., 1). If the block 270 is not associated with a read access restriction, then the read lock circuit 972 may store a second value (e.g., 0). Similarly, if the block 270 is associated with a program access restriction, then the program lock circuit 973 may store a first value (e.g., 1). If the block 270 is not associated with a program access restriction, then the program lock circuit 973 may store a second value (e.g., 0). In the example of FIG. 9, the program lock circuit 973 acts as both a program lock circuit and an erase lock circuit, with the functionality of program and erase locking being combined. Thus, a first value (e.g., 1) stored in the program lock circuit 973 indicates that the block 270 is locked for both writing and erasing, while a second value (e.g., 0) stored in the program lock circuit 973 indicates that the block 270 is unlocked for both writing and erasing. In some implementations, the latch circuitry 970 may include separate program lock circuits and erase lock circuits. Alternatively, the functionality of two or more of a read lock circuit, a program lock circuit, and an erase lock circuit may be combined in a single lock circuit. In some implementations, the read lock circuit stores a single bit, shown as "b0." Similarly, the program lock circuit 973 may store a single bit, shown as "b1."

The bad block circuit 971 may store a single bit that indicates whether the block 270 (e.g., corresponding to the BDL 280 in which the bad block circuit 971 is included) is a bad block that is not to be accessed and/or that is not capable of reliably storing data. For example, during testing after manufacture of the device 200, one or more blocks 270 may not operate within accepted tolerances. A manufacturer may store information (e.g., in a ROM block) indicating these bad blocks. Upon initialization, a bit of the bad block circuit 971 may be set to a value that indicates whether a corresponding block 270 is a bad block. For example, if the block 270 is a bad block, a bad block value stored by the bad block circuit 971 may be set to a first value (e.g., 1) during initialization. If the block 270 is a good block (or not a bad block), then the bad block value may be set to a second value (e.g., 0) during initialization.

As an example of operation of the BDL 280, assume that a corresponding block 270 is program locked, and that the program lock circuit 973 is programmed with a value of 1 (e.g., during initialization, as described above in connection with FIG. 8). Thus, the program lock circuit 973 outputs a value of 1 to the inverter 974, which outputs a value of 0 to the NOR logic gate 975. If the cryptographic signature is verified, then the verification bus 920 carries a verification signal value of 1. The NOR logic gate 975 receives a value of 0 and a value of 1, and thus outputs a value of 0 to the multiplexer 976. The multiplexer 976 receives a command signal value of 1, indicating that the command is a program command. Thus, the multiplexer 976 selects the value of 0 from the NOR logic gate 975 connected to the program lock circuit 973, and outputs the value of 0 to the OR logic gate 977. If the block 270 is a good block, then the bad block circuit 971 outputs a value of 0 to the OR logic gate 977. The OR logic gate 977 receives two 0 values and outputs a 0, which indicates that access to the block 270 is enabled for the command. If the block 270 is a bad block, then the bad block circuit 971 outputs a value of 1 to the OR logic gate 977, and an output of the OR logic gate 977 will be 1 regardless of a value received from the multiplexer 976, which disables access to the block 270 (e.g. because the block 270 is a bad block).

As another example of operation of the BDL 280, again assume that a corresponding block 270 is program locked, and that the program lock circuit 973 is programmed with a value of 1. Thus, the program lock circuit 973 outputs a value of 1 to the inverter 974, which outputs a value of 0 to the NOR logic gate 975. If the cryptographic signature is not verified, then the verification bus 920 carries a verification signal value of 0. The NOR logic gate 975 receives two 0 values, and thus outputs a value of 1 to the multiplexer 976. The multiplexer 976 receives a command signal value of 1, indicating that the command is a program command. Thus, the multiplexer 976 selects the value of 1 from the NOR logic gate 975 connected to the program lock circuit 973, and outputs the value of 1 to the OR logic gate 977. As a result, the output of the OR logic gate 977 is 1 regardless of a value received from the bad block circuit 971, which disables access to the block 270 (e.g. because the cryptographic command is not verified).

As another example of operation of the BDL 280, assume that a corresponding block 270 is not program locked, and that the program lock circuit 973 is programmed with a value of 0. Thus, the program lock circuit 973 outputs a value of 0 to the inverter 974, which outputs a value of 1 to the NOR logic gate 975. Regardless of whether the cryptographic signature is verified, the NOR logic gate 975 will output a value of 0 to the multiplexer 976 (based on receiving the value of 1 from the inverter 974). The multiplexer 976 receives a command signal value of 1, indicating that the command is a program command. Thus, the multiplexer 976 selects the value of 0 from the NOR logic gate 975 connected to the program lock circuit 973, and outputs the value of 0 to the OR logic gate 977. As a result, assuming that the block 270 is a good block, the output of the OR logic gate 977 will be a 0, which enables access to the block 270 (e.g. because the block 270 is not program locked).

As indicated above, FIG. 9 is provided as an example. Other examples may differ from what is described with regard to FIG. 9. For example, the quantity and arrangement of components shown in the BDL 280 are provided as an example. In practice, the BDL 280 may include additional components, fewer components, different components, or differently arranged components than those shown in FIG. 9. Furthermore, two or more components shown in the BDL 280 may be implemented within a single component, or a single component shown in the BDL 280 may be implemented as multiple, distributed components. Additionally, or alternatively, a set of components (e.g., one or more components) of the BDL 280 may perform one or more functions described as being performed by another set of components of the BDL 280.

Figure 10:
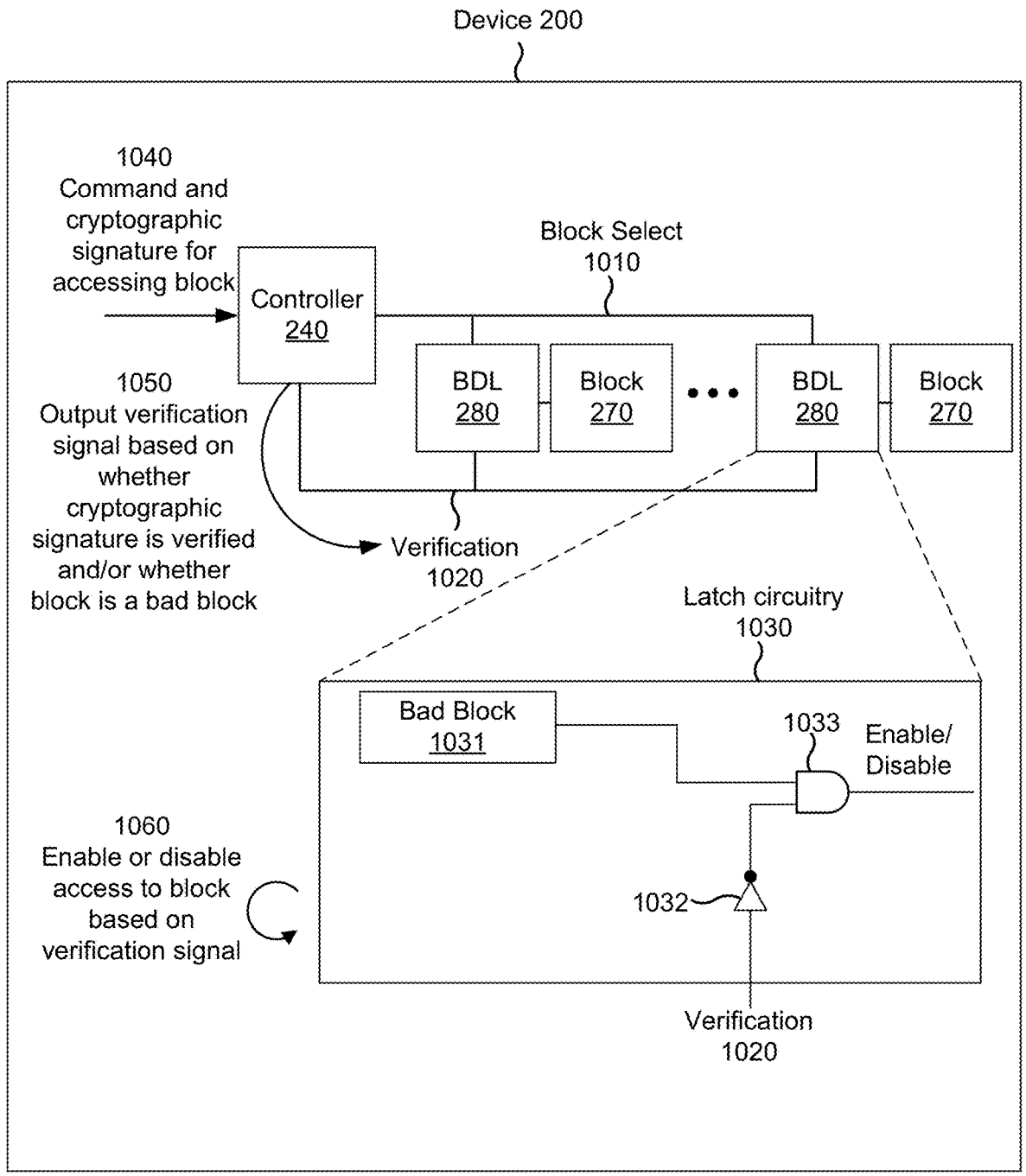

FIG. 10 is a diagram illustrating example operations associated with cryptographic block locking. The device 200 may perform one or more operations shown in FIG. 10 to apply a restriction indication for a block when a command to access that block is received. Based on the restriction indication, the command, and/or a cryptographic signature received in connection with the command, the device 200 may enable or disable access to the block associated with the command.

As shown in FIG. 10, the device 200 may include the controller 240 and one or more BDLs 280. Each BDL 280 may be considered a latch circuit. As further shown, the controller 240 may transmit signals to the BDLs 280 using a block select bus 1010 and/or a verification bus 1020. For example, the controller 240 may use the block select bus 1010 to select a BDL 280 (and corresponding block 270) to which a verification signal is to be transmitted, and the controller 240 may use the verification bus 1020 to transmit a verification signal to the selected BDL 280.

In the example of FIG. 10, the BDL 280 includes latch circuitry 1030. The latch circuitry 1030 includes a bad block circuit 1031, an inverter 1032, and an AND logic gate 1033. As shown, the verification signal may be provided as input to the inverter 1032 via the verification bus 1020. The inverter 1032 may flip or invert a value of the verification signal and output the result (e.g., an inverter output) to the AND logic gate 1033, which may also receive an output of the bad block circuit 1031. The AND logic gate 1033 may perform an AND operation on those inputs (e.g., based on an AND logic gate truth table) and may output the result as either an enable signal (to enable the command to be operate on the block 270) or a disable signal (e.g., to prevent the command from being performed on the block 270).

In the example of FIG. 10, the bad block circuit 1031 may be used to indicate whether a corresponding block 270 is a bad block, as described above in connection with FIG. 9. If the block 270 is not a bad block (e.g., is a good block capable of being accessed and/or capable of reliably storing data), then the device 200 may reuse the bad block circuit 1031 to store an indication of whether the block 270 is locked (e.g., whether access to the block 270 is restricted). Thus, in this example, the bad block circuit 1031 may store a single bit that indicates either whether the block 270 is a bad block or whether access to the block 270 is locked (e.g., restricted). In this case, to prevent access to bad blocks, the device 200 may be configured to store an indication of whether a bad block bit (e.g., the single bit stored by the bad block circuit 1031) indicates that the block is a bad block or that the block is locked. For example, the device 200 may store (e.g., in the block lock record) information that indicates block addresses of blocks that are bad blocks and/or block addresses of blocks that are good blocks. In some implementations, the device 200 may store information that indicates, for each block (e.g., of multiple blocks, of a plane 220, of multiple planes 220, and/or of non-volatile memory of the device 200), whether that block is a good block or a bad block.

As shown by reference number 1040, the device 200 (e.g., the controller 240) may receive a command and/or a cryptographic signature for accessing a block 270, such as an individual block of memory (e.g., one of multiple blocks of memory of the non-volatile memory, of a plane 220, of multiple planes 220, or of a memory array of the non-volatile memory), as described above in connection with reference number 620 of FIG. 6, reference number 710 of FIG. 7, and reference number 940 of FIG. 9.

As shown by reference number 1050, the device 200 (e.g., the controller 240) may output a verification signal (e.g., via the verification bus 1020) based on whether the cryptographic signature is verified and/or whether the block 270 identified by the command is a bad block. For example, the device 200 (e.g., the controller 240) may first determine whether the block 270 is a bad block. In some implementations, the device 200 may use a block lock record or other stored data to look up a bad block indication associated with the block 270. The bad block indication may indicate whether the block 270 is a bad block or a good block. For example, the bad block indication may be a single bit that has a first value (e.g., 1) if the block 270 is a bad block, and that has a second value (e.g., 0) if the block 270 is a good block. Bad block indications may be stored in the security block 230 and/or a block lock record, and bad block indications may be set after testing blocks by the manufacturer of the device 200. In some implementations, bad block indications may be stored in a similar manner as the data formats described above in connection with FIG. 5 (e.g., substituting a single bit bad block indication for the two bit or three bit set of restriction indications).

If the bad block indication associated with the block 270 indicates that the block 270 is a bad block, then the controller 240 may output a verification signal having a second value (e.g., 0). The second value typically indicates that the cryptographic signature is not verified, but in this case, the second value is output regardless of whether the cryptographic signature is verified so as to disable access to the block 270 due to the block being a bad block.

If the bad block indication associated with the block 270 indicates that the block 270 is a good block, then the controller 240 may determine whether the cryptographic signature is verified. If the cryptographic signature is verified, then the controller 240 may output a verification signal having a first value (e.g., 1), which indicates that the cryptographic signature is verified. If the cryptographic signature is not verified, then the controller 240 may output a verification signal having a second value (e.g., 0), which indicates that the cryptographic signature is not verified.

As shown by reference number 1060, the device 200 (e.g., a BDL 280) may enable or disable access to a corresponding block 270 based on the verification signal. In some implementations, the BDL 280 to enable or disable access to a corresponding block 270 based on the verification signal and information stored in the bad block circuit 1031 of the BDL 280. For example, if the information stored in the bad block circuit 1031 indicates that the block 270 is not locked (e.g., using a value of 0), then the BDL 280 may output an enable signal to enable the command to be performed for the block 270, regardless of a value of the verification signal. As another example, if the information stored in the bad block circuit 1031 indicates that the block 270 is locked (e.g., using a value of 1), and the verification signal indicates that the cryptographic signature is verified (e.g., the verification signal has a first value, such as 1), then the BDL 280 may output an enable signal to enable the command to be performed for the block 270. As another example, if the information stored in the bad block circuit 1031 indicates that the block 270 is locked (e.g., using a value of 1), and the verification signal indicates that the cryptographic signature is not verified (e.g., the verification signal has a second value, such as 0), then the BDL 280 may output a disable signal to prevent the command from being performed for the block 270.

As an example of operation of the BDL 280, assume that a corresponding block 270 is locked, and that the bad block circuit 1031 is programmed with a value of 1 (e.g., during initialization, in a similar manner as described above in connection with FIG. 8). Thus, the bad block circuit 1031 outputs a value of 1 to the AND logic gate 1033. If the controller 240 determines that the block 270 is a good block and that the cryptographic signature is verified, then the verification bus 1020 carries a verification signal value of 1. The inverter 1032 receives the verification signal value of 1, and the inverter 1032 flips or inverts that value to output a result (e.g., an inverter output) of 0. Thus, the AND logic gate 1033 receives a value of 0 and a value of 1, and the AND logic gate 1033 outputs a 0 (e.g., based on an AND logic gate truth table), which indicates that access to the block 270 is enabled (e.g., because the block 270 is a good block and the cryptographic signature is verified).

As another example of operation of the BDL 280, again assume that a corresponding block 270 is locked, and that the bad block circuit 1031 is programmed with a value of 1. Thus, the bad block circuit 1031 outputs a value of 1 to the AND logic gate 1033. If the controller 240 determines that the block 270 is a good block and that the cryptographic signature is not verified, then the verification bus 1020 carries a verification signal value of 0. The inverter 1032 receives the verification signal value of 0, and the inverter 1032 flips or inverts that value to output a result (e.g., an inverter output) of 1. Thus, the AND logic gate 1033 receives two values of 1, and the AND logic gate 1033 outputs a 1 (e.g., based on an AND logic gate truth table), which indicates that access to the block 270 is disabled (e.g., because the block 270 is a good block but the cryptographic signature is not verified).

As another example of operation of the BDL 280, assume that a corresponding block 270 is unlocked, and that the bad block circuit 1031 is programmed with a value of 0. Thus, the bad block circuit 1031 outputs a value of 0 to the AND logic gate 1033. In this case, regardless of a value of the verification signal, the AND logic gate 1033 receives at least one value of 0, and thus the AND logic gate 1033 outputs a 0 (e.g., based on an AND logic gate truth table), which indicates that access to the block 270 is enabled (e.g., because the block 270 is unlocked).

As another example of operation of the BDL 280, assume that a corresponding block 270 is a bad block, and that the bad block circuit 1031 is programmed with a value of 1. Thus, the bad block circuit 1031 outputs a value of 1 to the AND logic gate 1033. In this case, as described above in connection with reference number 1050, the controller 240 will output a verification signal value of 0 based on determining that the block 270 is a bad block (e.g., regardless of whether the cryptographic signature is verified). The inverter 1032 receives the verification signal value of 0, and the inverter 1032 flips or inverts that value to output a result (e.g., an inverter output) of 1. Thus, the AND logic gate 1033 receives two values of 1, and the AND logic gate 1033 outputs a 1 (e.g., based on an AND logic gate truth table), which indicates that access to the block 270 is disabled (e.g., because the block 270 is a bad block).

In some implementations, the device 200 (e.g., the controller 240) may determine whether the block 270 is locked for a command type associated with the command (e.g., for a read command type, a write command type, or an erase command type), in a similar manner as described above in connection with reference number 720 of FIG. 7. For example, the device 200 may use the block address, associated with the command, to identify one or more restriction indications corresponding to the block address (e.g., in a block lock record). If the block 270 is not locked for the command type associated with the command, then the controller 240 may output a verification signal having a first value (e.g., 1) regardless of whether the command is associated with a cryptographic signature and/or regardless of whether the cryptographic signature (if received) is verified. If the block 270 is locked for the command type associated with the command, and the cryptographic signature is verified, then the controller 240 may output a verification signal having a first value (e.g., 1) to indicate that the cryptographic signature is verified. If the block 270 is locked for the command type associated with the command, and the cryptographic signature is not verified, then the controller 240 may output a verification signal having a second value (e.g., 0) to indicate that the cryptographic signature is not verified.

In this way, the device 200 (e.g., the controller 240 and/or a BDL 280) is capable of separately restricting access to each individual block of multiple blocks included in, for example, non-volatile memory, a plane of non-volatile memory, or multiple planes of non-volatile memory (e.g., NAND memory). Locking or unlocking individual blocks of memory enables more flexibility in data storage and data security, enables sensitive data or more important data may be stored in a locked block for increased security while non-sensitive data or less important data is stored in an unlocked block for faster access.

As indicated above, FIG. 10 is provided as an example. Other examples may differ from what is described with regard to FIG. 10. For example, the quantity and arrangement of components shown in the BDL 280 are provided as an example. In practice, the BDL 280 may include additional components, fewer components, different components, or differently arranged components than those shown in FIG. 10. Furthermore, two or more components shown in the BDL 280 may be implemented within a single component, or a single component shown in the BDL 280 may be implemented as multiple, distributed components. Additionally, or alternatively, a set of components (e.g., one or more components) of the BDL 280 may perform one or more functions described as being performed by another set of components of the BDL 280.

Figure 11:
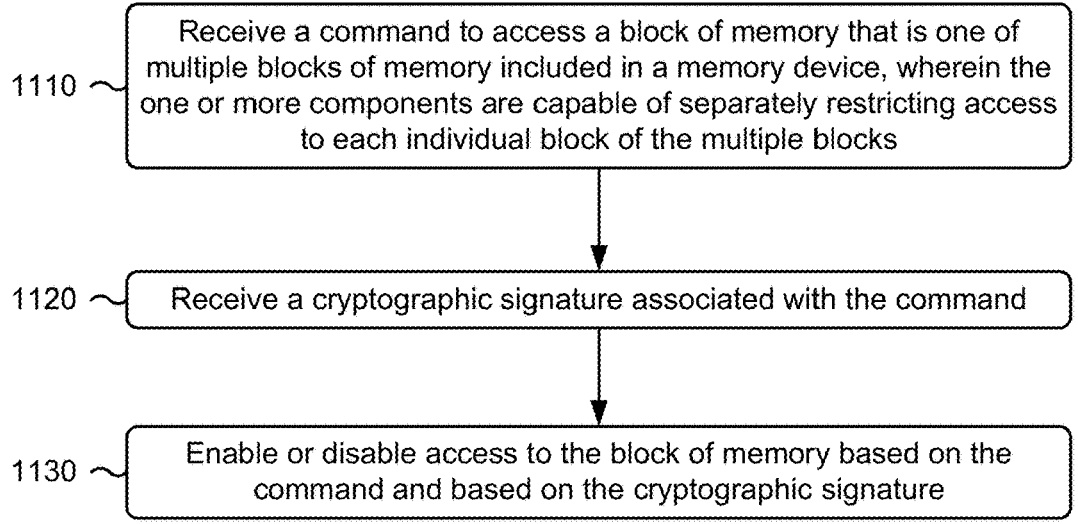
FIGS. 11-14 are flowcharts of example methods associated with cryptographic block locking.

FIG. 11 is a flowchart of an example method 1100 associated with cryptographic block locking. In some implementations, one or more process blocks of FIG. 11 may be performed by a memory device (e.g., memory device 140 and/or device 200). Additionally, or alternatively, one or more process blocks of FIG. 11 may be performed by one or more components of the memory device, such as the controller 240 and/or a BDL 280.

As shown in FIG. 11, the method 1100 may include receiving a command to access a block of memory that is one of multiple blocks of memory included in the memory device, wherein the one or more components are capable of separately restricting access to each individual block of the multiple blocks (block 1110). As further shown in FIG. 11, the method 1100 may include receiving a cryptographic signature associated with the command (block 1120). As further shown in FIG. 11, the method 1100 may include enabling or disable access to the block of memory based on the command and based on the cryptographic signature (block 1130).

Although FIG. 11 shows example blocks of a method 1100, in some implementations, the method 1100 may include additional blocks, fewer blocks, different blocks, or differently arranged blocks than those depicted in FIG. 11. Additionally, or alternatively, two or more of the blocks of the method 1100 may be performed in parallel. The method 1100 is an example of one method that may be performed by one or more devices described herein. These one or more devices may perform one or more other methods based on operations described herein, such as the operations described in connection with FIGS. 4-10.

Figure 12:
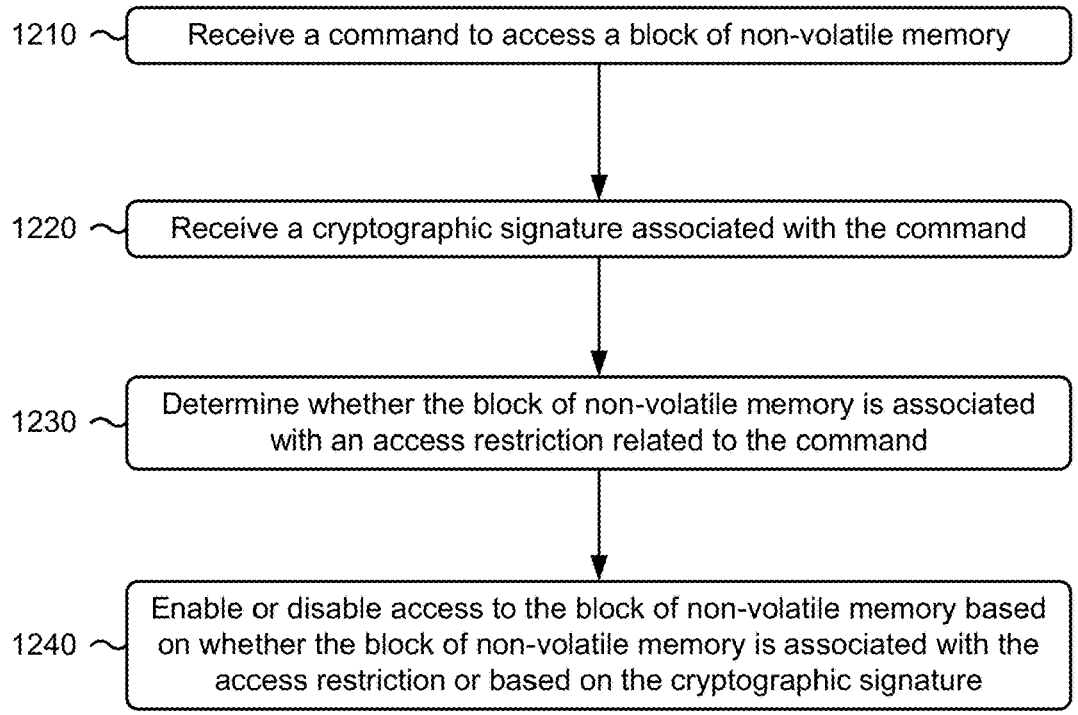

FIG. 12 is a flowchart of an example method 1200 associated with cryptographic block locking. In some implementations, one or more process blocks of FIG. 12 may be performed by a memory device (e.g., memory device 140 and/or device 200). Additionally, or alternatively, one or more process blocks of FIG. 12 may be performed by one or more components of the memory device, such as the controller 240.

As shown in FIG. 12, the method 1200 may include receiving a command to access a block of non-volatile memory (block 1210). As further shown in FIG. 12, the method 1200 may include receiving a cryptographic signature associated with the command (block 1220). As further shown in FIG. 12, the method 1200 may include determining whether the block of non-volatile memory is associated with an access restriction related to the command (block 1230). As further shown in FIG. 12, the method 1200 may include enabling or disable access to the block of non-volatile memory based on whether the block of non-volatile memory is associated with the access restriction or based on the cryptographic signature (block 1240).

Although FIG. 12 shows example blocks of a method 1200, in some implementations, the method 1200 may include additional blocks, fewer blocks, different blocks, or differently arranged blocks than those depicted in FIG. 12. Additionally, or alternatively, two or more of the blocks of the method 1200 may be performed in parallel. The method 1200 is an example of one method that may be performed by one or more devices described herein. These one or more devices may perform one or more other methods based on operations described herein, such as the operations described in connection with FIGS. 4-10.

Figure 13:
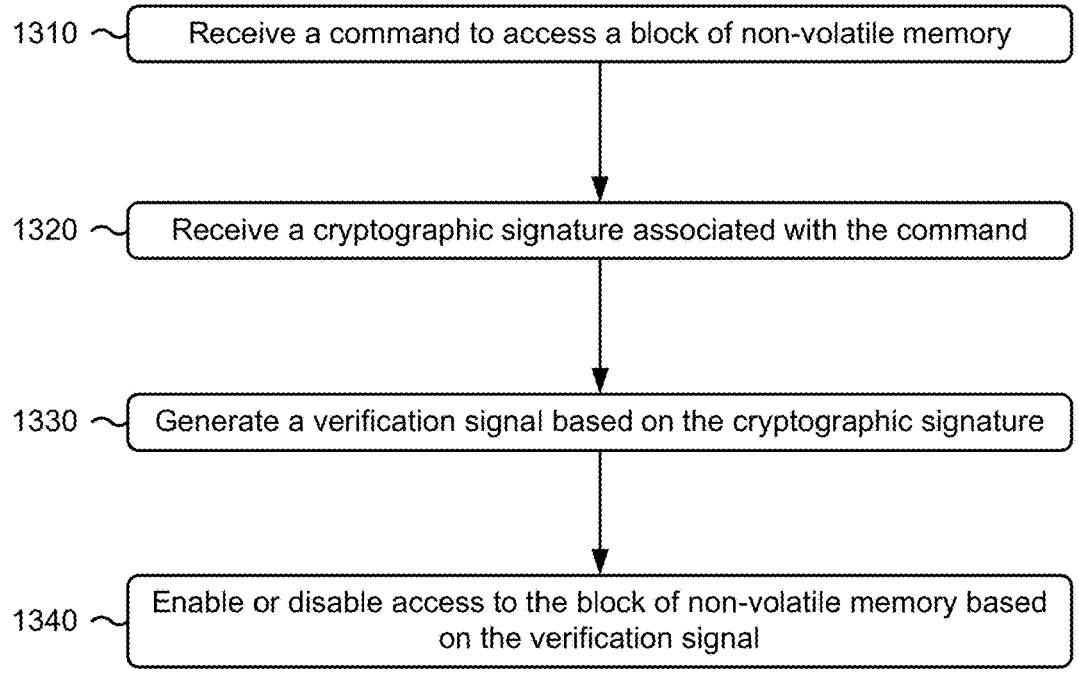

FIG. 13 is a flowchart of an example method 1300 associated with cryptographic block locking. In some implementations, one or more process blocks of FIG. 13 may be performed by a memory device (e.g., memory device 140 and/or device 200). Additionally, or alternatively, one or more process blocks of FIG. 13 may be performed by one or more components of the memory device, such as the controller 240 and/or a BDL 280.

As shown in FIG. 13, the method 1300 may include receiving a command to access a block of non-volatile memory (block 1310). As further shown in FIG. 13, the method 1300 may include receiving a cryptographic signature associated with the command (block 1320). As further shown in FIG. 13, the method 1300 may include generating a verification signal based on the cryptographic signature (block 1330). As further shown in FIG. 13, the method 1300 may include enabling or disable access to the block of non-volatile memory based on the verification signal (block 1340).

Although FIG. 13 shows example blocks of a method 1300, in some implementations, the method 1300 may include additional blocks, fewer blocks, different blocks, or differently arranged blocks than those depicted in FIG. 13. Additionally, or alternatively, two or more of the blocks of the method 1300 may be performed in parallel. The method 1300 is an example of one method that may be performed by one or more devices described herein. These one or more devices may perform one or more other methods based on operations described herein, such as the operations described in connection with FIGS. 4-10.

Figure 14:
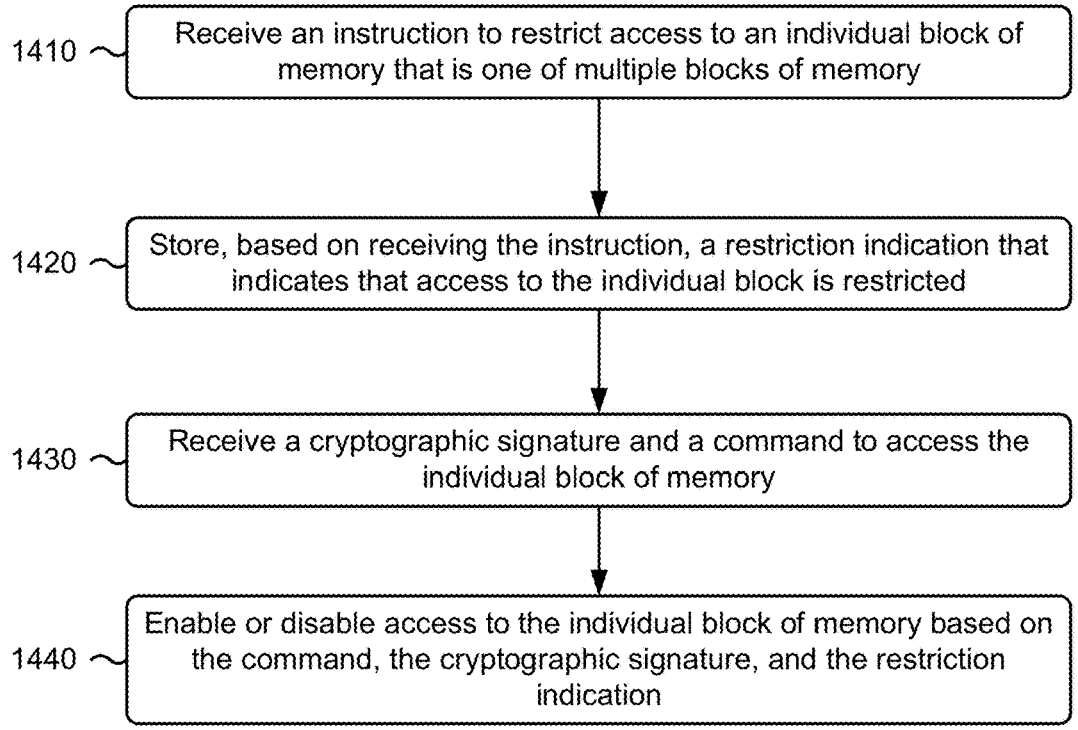

FIG. 14 is a flowchart of an example method 1400 associated with cryptographic block locking. In some implementations, one or more process blocks of FIG. 14 may be performed by a memory device (e.g., memory device 140 and/or device 200). Additionally, or alternatively, one or more process blocks of FIG. 14 may be performed by one or more components of the memory device, such as the controller 240 and/or a BDL 280.

As shown in FIG. 14, the method 1400 may include receiving an instruction to restrict access to an individual block of memory that is one of multiple blocks of memory (block 1410). As further shown in FIG. 14, the method 1400 may include storing, based on receiving the instruction, a restriction indication that indicates that access to the individual block is restricted (block 1420). In some implementations, a separate restriction indication is stored for each individual block of the multiple blocks. As further shown in FIG. 14, the method 1400 may include receiving a cryptographic signature and a command to access the individual block of memory (block 1430). As further shown in FIG. 14, the method 1400 may include enabling or disabling access to the individual block of memory based on the command, the cryptographic signature, and the restriction indication (block 1440).

Although FIG. 14 shows example blocks of a method 1400, in some implementations, the method 1400 may include additional blocks, fewer blocks, different blocks, or differently arranged blocks than those depicted in FIG. 14. Additionally, or alternatively, two or more of the blocks of the method 1400 may be performed in parallel. The method 1400 is an example of one method that may be performed by one or more devices described herein. These one or more devices may perform one or more other methods based on operations described herein, such as the operations described in connection with FIGS. 4-10.

Figure 15:
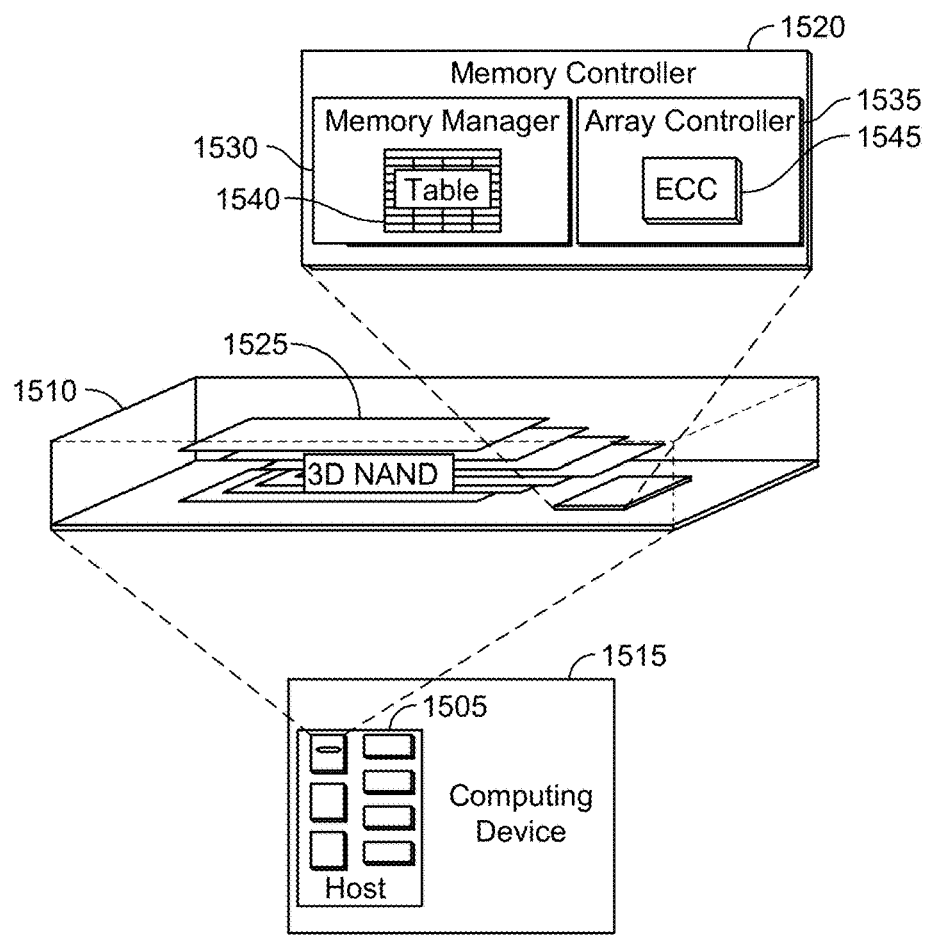
FIG. 15 is a diagram illustrating an example environment that includes a memory device.

FIG. 15 is a diagram illustrating an example environment 1500 that includes a memory device. As shown in FIG. 15, the environment 1500 includes a host device 1505 and a memory device 1510 configured to communicate via a communication interface. The host device 1505 and/or the memory device 1510 may be included in a computing device 1515, such as a computer, a server, and/or an IoT device. For example, the memory device 1510 may be a discrete memory component of the host device 1505. Alternatively, the memory device 1510 may be a portion of an integrated circuit that is included with one or more other components of the host device 1505. In some implementations, the host device 1505 may be the host device 110 of FIG. 1, and/or the memory device 1510 may be the memory device 140 and/or the device 200.

The memory device 1510 may include a memory controller 1520, which may be the controller 240. Additionally, or alternatively, the memory device 1510 may include a memory array 1525. The memory array 1525 may include one or more memory dies. The memory array 1525 is shown as a three-dimensional (3D) NAND array. In 3D array semiconductor memory technology, memory structures are stacked vertically, which increases the quantity of memory cells that can fit in a given die size. Although the memory array 1525 is shown as a 3D array, in some implementations, the memory array 1525 is a two-dimensional (2D) array.

The host device 1505 and/or the memory device 1510 may include one or more communication interfaces configured to transfer data between the memory device 1510 and one or more components of the host device 1505. For example, the host device 1505 and/or the memory device 1510 may include a Serial Advanced Technology Attachment (SATA) interface, a Peripheral Component Interconnect Express (PCIe) interface, a USB interface, a Universal Flash Storage (UFS) interface, and/or an embedded multimedia card (eMMC) interface.

The memory controller 1520 may include, for example, one or more processors, a microcontroller, an ASIC, and/or an FPGA. In some implementations, a non-transitory computer-readable medium (e.g., volatile memory and/or non-volatile memory) may store a set of instructions (e.g., one or more instructions or code) for execution by the memory controller 1520. The memory controller 1520 may execute the set of instructions to perform one or more operations or methods described herein. In some implementations, execution of the set of instructions, by the controller 240 memory controller 1520, causes the memory controller 1520 and/or the memory device 1510 to perform one or more operations or methods described herein. In some implementations, hardwired circuitry is used instead of or in combination with the instructions to perform one or more operations or methods described herein. Additionally, or alternatively, the memory controller 1520 and/or one or more components of the memory device 1510 may be configured to perform one or more operations or methods described herein.

The memory controller 1520 may receive one or more instructions from the host device 1505 and may communicate with the memory array based on the one or more instructions, such as to transfer data to (e.g., write or program), to transfer data from (e.g., read), and/or to erase a portion of the memory array 1525 (e.g., one or more memory cells, pages, sub-blocks, blocks, or planes of the memory array 1525). Additionally, or alternatively, the memory controller 1520 may include one or more components configured to control access to the memory array 1525 and/or to provide a translation layer between the host device 1505 and the memory device 1510 for access to the memory array 1525. The memory controller 1520 may include one or more input/output (I/O) circuits, lines, or interfaces to transfer data to or from the memory array 1525. In some implementations, the memory controller 1520 may include a memory manager 1530 and/or an array controller 1535.

The memory manager 1530 may include one or more components (e.g., circuitry) configured to perform one or more memory management functions, such as wear leveling, error detection, error correction, block retirement, or one or more other memory management functions. The memory manager 1530 may parse or format a host command (e.g., a command received from the host device 1505) into a memory command (e.g., a command for performing an operation on the memory array 1525). Additionally, or alternatively, the memory manager 1530 may generate one or more memory commands based on one or more instructions received from the array controller 1535 and/or one or more other components of the memory device 1510.

The memory manager 1530 may include or may operate using one or more memory management tables 1540 configured to store information associated with the memory array 1525. For example, a memory management table 1540 may include information regarding block age, block erase count, error history, or one or more error counts associated with one or more blocks of memory cells included in the memory array 1525.

The array controller 1535 may include one or more components (e.g., circuitry) configured to control one or more memory operations associated with writing data to, reading data from, or erasing one or more memory cells of the memory array 1525. The one or more memory operations may be based on, for example, a host command received from the host device 1505 or a command generated internally by the memory device 1510 (e.g., in association with wear leveling, error detection, and/or error correction). In some implementations, the array controller 1535 may include an error correction code (ECC) component 1545. The ECC component 1545 may include one or more components configured to detect or correct errors associated with writing data to or reading data from one or more memory cells of the memory array 1525.

One or more devices or components shown in FIG. 15 may be used to carry out operations described elsewhere herein, such as one or more operations of FIGS. 4-10 and/or one or more process blocks of the methods of FIGS. 11-14.

As indicated above, FIG. 15 is provided as an example. Other examples may differ from what is described with regard to FIG. 15.

Figure 16:
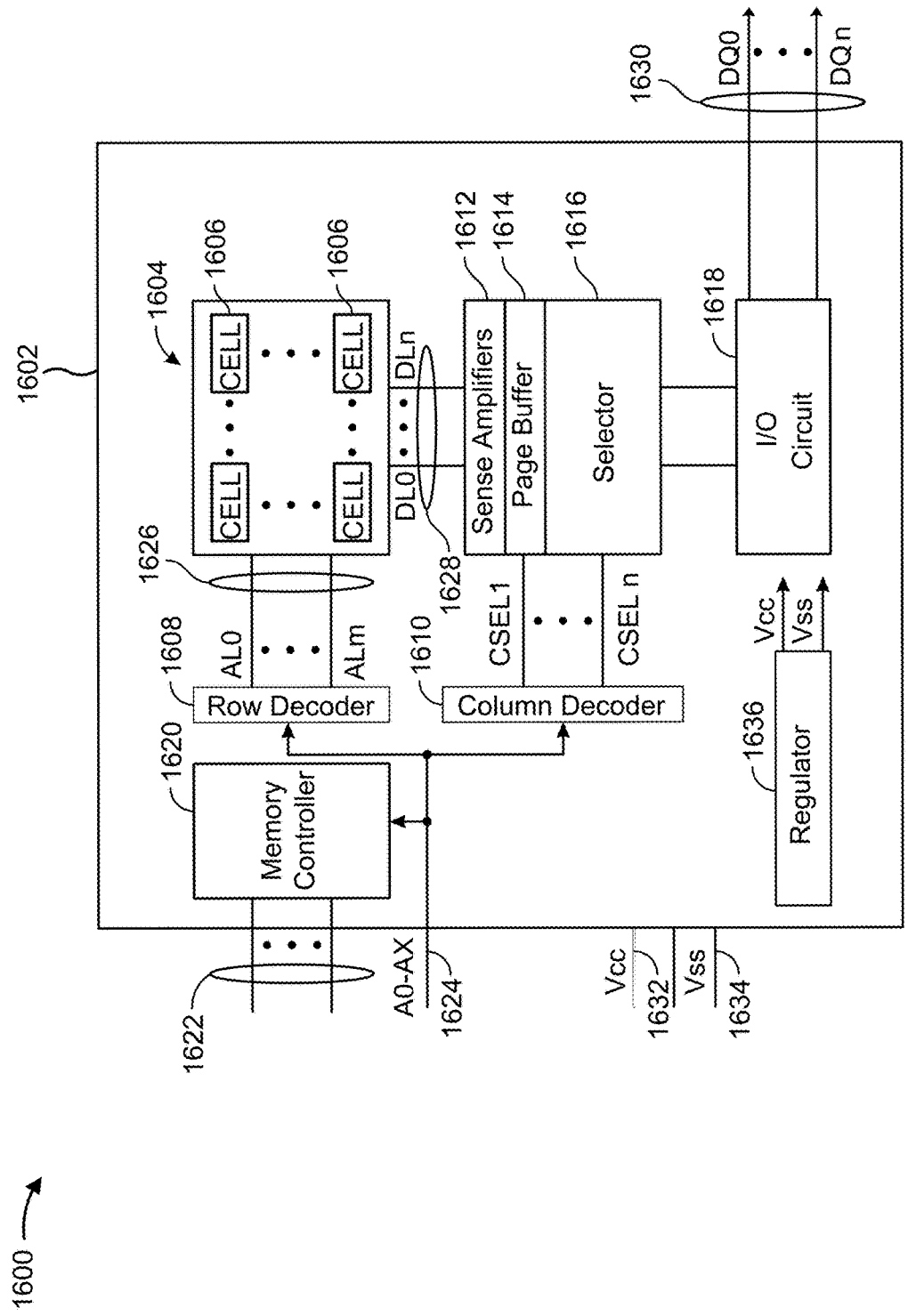
FIG. 16 is a diagram illustrating an example of components included in a memory device.

FIG. 16 is a diagram illustrating an example 1600 of components included in a memory device 1602. The memory device 1602 may be the memory device 140, the device 200, and/or the memory device 1510. The memory device 1602 may include a memory array 1604 having multiple memory cells 1606. The memory device 1602 may include one or more components (e.g., circuits) to transmit signals to or perform memory operations on the memory array 1604. For example, the memory device 1602 may include a row decoder 1608, a column decoder 1610, one or more sense amplifiers 1612, a page buffer 1614, a selector 1616, an input/output (I/O) circuit 1618, and a memory controller 1620. The memory controller 1620 may be the controller 240 and/or the memory controller 1520.

The memory controller 1620 may control memory operations of the memory device 1602 according to one or more signals received via one or more control lines 1622, such as one or more clock signals or control signals that indicate an operation (e.g., write, read, or erase) to be performed. Additionally, or alternatively, the memory controller 1620 may determine one or memory cells 1606 upon which the operation is to be performed based on one or more signals received via one or more address lines 1624, such as one or more address signals (shown as A0-AX). A host device external from the memory device 1602 may control the values of the control signals on the control lines 1622 and/or the address signals on the address line 1624.

The memory device 1602 may use access lines 1626 (sometimes called word lines or row lines, and shown as AL0-ALm) and data lines 1628 (sometimes called digit lines, bit lines, or column lines, and shown as DL0-DLn) to transfer data to or from one or more of the memory cells 1606. For example, the row decoder 1608 and the column decoder 1610 may receive and decode the address signals (A0-AX) from the address line 1624 and may determine which of the memory cells 1606 are to be accessed based on the address signals. The row decoder 1608 and the column decoder 1610 may provide signals to those memory cells 1606 via one or more access lines 1626 and one or more data lines 1628, respectively.

For example, the column decoder 1610 may receive and decode address signals into one or more column select signals (shown as CSEL1-CSELn). The selector 1616 may receive the column select signals and may select data in the page buffer 1614 that represents values of data to be read from or to be programmed into memory cells 1606. The page buffer 1614 may be configured to store data received from a host device before the data is programmed into relevant portions of the memory array 1604, or the page buffer 1614 may store data read from the memory array 1604 before the data is transmitted to the host device. The sense amplifiers 1612 may be configured to determine the values to be read from or written to the memory cells 1606 using the data lines 1628. For example, in a selected string of memory cells 1606, a sense amplifier 1612 may read a logic level in a memory cell 1606 in response to a read current flowing through the selected string to a data line 1628. The I/O circuit 1618 may transfer values of data in or out of the memory device 1602 (e.g., to or from a host device), such as in or out of the page buffer 1614 or the memory array 1604, using I/O lines 1630 (shown as (DQ0-DQN)).

The memory controller 1620 may receive positive and negative supply signals, such as a supply voltage (Vcc) 1632 and a negative supply (Vss) 1634 (e.g., a ground potential), from an external source or power supply (e.g., an internal battery, an external battery, and/or an AC-to-DC converter). In some implementations, the memory controller 1620 may include a regulator 1636 to internally provide positive or negative supply signals.

One or more devices or components shown in FIG. 16 may be used to carry out operations described elsewhere herein, such as one or more operations of FIGS. 4-10 and/or one or more process blocks of the methods of FIGS. 11-14.

As indicated above, FIG. 16 is provided as an example. Other examples may differ from what is described with regard to FIG. 16.

Figure 17:
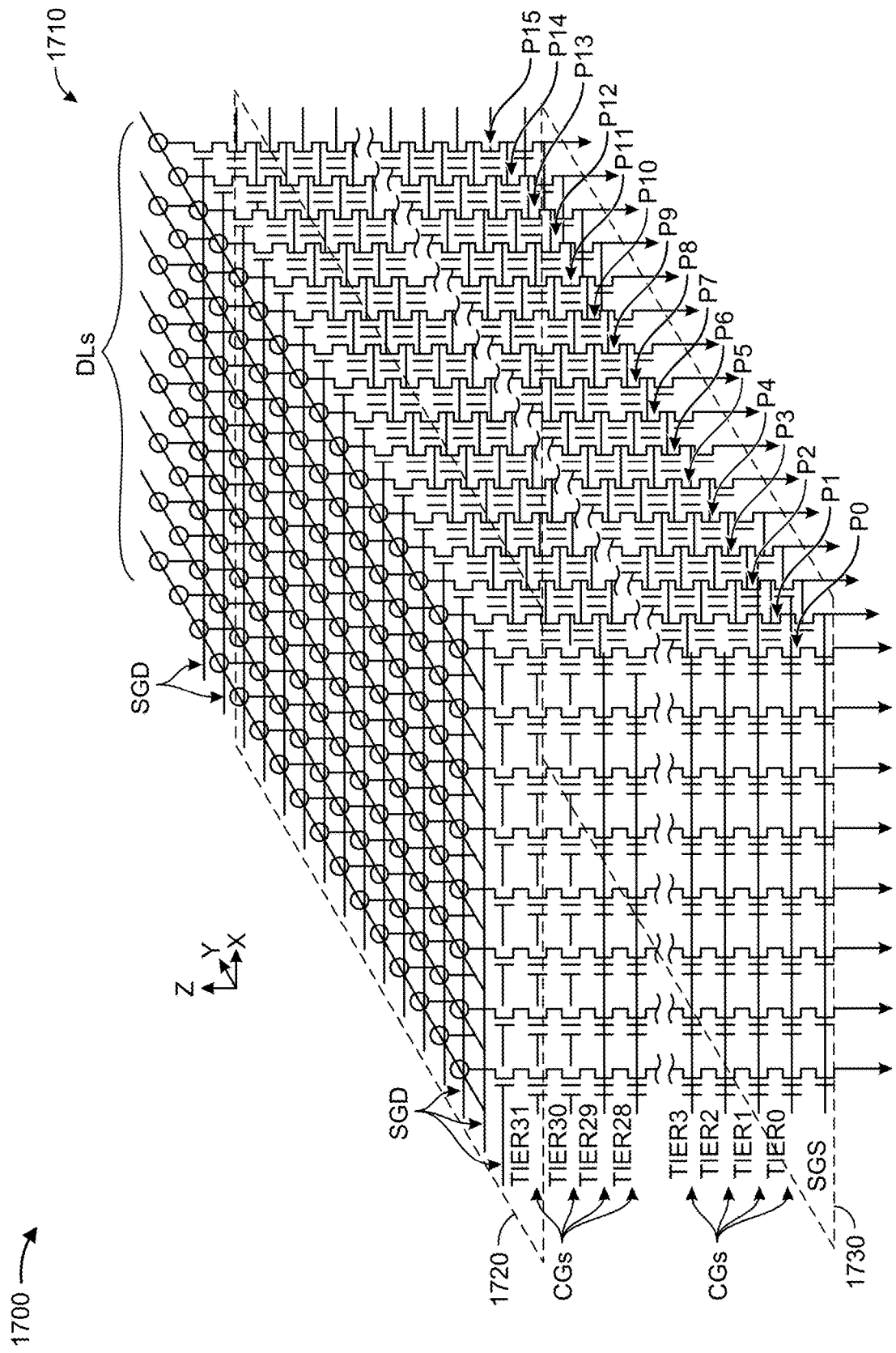
FIG. 17 is a diagram illustrating an example of a memory array.

FIG. 17 is a diagram illustrating an example 1700 of a memory array 1710. Although FIG. 17 shows a 3D NAND memory array, some implementations described herein may be performed in connection with another type of memory array, such as a 2D memory array.

The memory array 1710 includes multiple strings of memory cells, and each string including 32 tiers (shown as TIER0-TIER31) of charge storage transistors stacked in the Z direction, source to drain, from a source-side select gate (SGS) to a drain-side select gate (SGD). Each string of memory cells in the memory array 1710 may be arranged along the Y direction as data lines (shown as DLs), and along the X direction as pages (shown as P0-P15). Within a page, each tier represents a row of memory cells, and each string of memory cells represents a column. A block of memory cells may include a number of pages (e.g., 128 or 384). In other examples, each string of memory cells may include a different number of tiers (e.g., 8, 16, 64, or 128), and/or one or more additional tiers of semiconductor material above or below the charge storage transistors (e.g., to form select gates or data lines).

Each memory cell in the memory array 1710 includes a control gate coupled to (e.g., electrically or otherwise operatively connected to) an access line, which collectively couples the control gates across a specific tier or a portion of a tier. Specific tiers in the 3D memory array, and accordingly, specific memory cells in a string, may be accessed or controlled using respective access lines. For example, the memory array 1710 includes a first level of semiconductor material 1720 (e.g., silicon material, such as polysilicon) that couples the control gates of each memory cell in TIER31, and a second level of semiconductor material 1730 that couples the SGS of the array. Similar levels of metal or semiconductor material may couple the control gates for each tier. Specific strings of memory cells in the array may be accessed, selected, or controlled using a combination of data lines (DLs) and select gates, and specific memory cells at one or more tiers in the specific strings may be accessed, selected, or controlled using one or more access lines. In some implementations, the memory device 140, the device 200, the memory device 1510, and/or the memory device 1602 may include the memory array 1710 of FIG. 17. For example, the memory array 1525 and/or the memory array 1604 may be the memory array 1710.

As indicated above, FIG. 17 is provided as an example. Other examples may differ from what is described with regard to FIG. 17.

In some implementations, a memory device includes one or more components configured to receive a command to access a block of memory that is one of multiple blocks of memory included in the memory device, wherein the one or more components are capable of separately restricting access to each individual block of the multiple blocks; receive a cryptographic signature associated with the command; and enable or disable access to the block of memory based on the command and based on the cryptographic signature.

In some implementations, a device includes a controller configured to receive a command to access a block of non-volatile memory; receive a cryptographic signature associated with the command; determine whether the block of non-volatile memory is associated with an access restriction related to the command; and enable or disable access to the block of non-volatile memory based on whether the block of non-volatile memory is associated with the access restriction or based on the cryptographic signature.

In some implementations, a device includes a controller configured to receive a command to access a block of non-volatile memory; receive a cryptographic signature associated with the command; and output a verification signal based on the cryptographic signature. In some implementations, the device includes latch circuitry configured to receive the verification signal; and enable or disable access to the block of non-volatile memory, associated with the latch circuitry, based on the verification signal.

In some implementations, an apparatus includes means for receiving an instruction to restrict access to an individual block of memory that is one of multiple blocks of memory included in the apparatus; means for storing, based on receiving the instruction, a restriction indication that indicates that access to the individual block is restricted, wherein a separate restriction indication is stored for each individual block of the multiple blocks; means for receiving a cryptographic signature and a command to access the individual block of memory; and means for enabling or disabling access to the individual block of memory based on the command, the cryptographic signature, and the restriction indication.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
    one or more components configured to:
        receive a command to access a block of memory that is one of multiple blocks of memory included in the memory device;
        identify whether read access, write access, or erase access to the block of memory is restricted; and
        receive a cryptographic signature associated with the command; and
    latch circuitry configured to enable or disable access to the block of memory,
    wherein the latch circuitry comprises:
        a lock circuit that stores information indicating whether the block of memory is locked for one or more functions;
        a NOR gate, configured to receive an input of a verification signal and an input based on the lock circuit; and
        a multiplexer configured to receive an input from an output of the NOR gate, wherein access to the block of memory is enabled or disabled based on an output of the multiplexer.

2. The memory device of claim 1, wherein the one or more components are further configured to:
    receive an indication of a block address that identifies the block; and
    determine, based on the block address, whether access to the block is restricted; and
    wherein the one or more components, to enable or disable access to the block, are configured to enable or disable access to the block of memory further based on determining whether access to the block is restricted.

3. The memory device of claim 1,
    wherein the one or more components are further configured to output the verification signal that indicates whether the cryptographic signature is verified.

4. The memory device of claim 1, wherein the one or more components are further configured to enable or disable access to the block of memory, for each command to access the block of memory, based on a corresponding cryptographic signature received in connection with that command.

5. The memory device of claim 1, wherein the one or more components are further configured to enable or disable access to the block of memory, for each command to access the block of memory, based on a corresponding cryptographic signature received in connection with that command unless access to the block has been enabled for multiple commands.

6. The memory device of claim 1, wherein the one or more components are further configured to:
    receive an instruction to enable access to the block of memory for multiple commands;
    store an indication that access to the block of memory is enabled based on verifying the cryptographic signature for the command;
    receive another command to access the block of memory; and
    enable access to the block of memory for the other command based on the stored indication that access to the block of memory is enabled.

7. The memory device of claim 6, wherein the one or more components are further configured to store an indication that access to the block of memory for multiple commands is disabled based on at least one of:

reception of an instruction to disable access to the block of memory for multiple commands;
reception of a command that identifies another block of memory that is different from the block of memory; or
powering up or powering down of the memory device.

8. A device, comprising:
a controller configured to:
receive a command to access a block of non-volatile memory;
receive a cryptographic signature associated with the command; and
determine whether the block is associated with an access restriction related to the command; and
latch circuitry, separate from the block, configured to enable or disable access to the block based on whether the block is associated with the access restriction or based on the cryptographic signature,
wherein the latch circuitry comprises:
one or more lock circuits that store information indicating whether the block is locked for one or more functions;
one or more NOR gates, each configured to receive an input of a verification signal and an input based on the one or more lock circuits; and
a multiplexer configured to receive an input from an output of the one or more NOR gates, wherein access to the block is enabled or disabled based on an output of the multiplexer.

9. The device of claim 8, wherein the controller, to determine whether the block is associated with the access restriction, is configured to:
receive an indication of a block address that identifies the block; and
identify one or more block attributes that are associated with the block in a record, wherein the one or more block attributes indicate whether the block is associated with a read access restriction, a write access restriction, or an erase access restriction.

10. The device of claim 8, wherein the controller, to enable or disable access to the block, is configured to:
determine, based on a block address of the block, that the block is not associated with the access restriction; and
enabling access to the block based on determining that the block is not associated with the access restriction.

11. The device of claim 10, wherein the controller, to determine that the block is not associated with the access restriction, is configured to:
identify a command type associated with the command, wherein the command type is one of a read command type, a write command type, or an erase command type; and
determine that the block is not associated with the access restriction for the command type.

12. The device of claim 8, wherein the controller, to enable or disable access to the block, is configured to:
determine, based on a block address of the block, that the block is associated with the access restriction;
determine that the cryptographic signature is verified; and
enable access to the block based on determining that the block is associated with the access restriction and that the cryptographic signature is verified.

13. The device of claim 12, wherein the controller, to determine that the block is associated with the access restriction, is configured to:
identify a command type associated with the command, wherein the command type is one of a read command type, a write command type, or an erase command type; and
determine that the block is associated with the access restriction for the command type.

14. The device of claim 8, wherein the controller, to enable or disable access to the block, is configured to:
determine, based on a block address of the block, that the block is associated with the access restriction;
determine that the received cryptographic signature is not verified; and
disable access to the block based on determining that the block is associated with the access restriction and that the cryptographic signature is not verified.

15. A device, comprising:
a controller configured to:
receive a command to access a block of non-volatile memory, wherein the device stores:
a first indication indicating whether a first type of access to the block of non-volatile memory is restricted,
a second indication indicating whether a second type of access to the block of non-volatile memory is restricted, and
a third indication indicating whether a third type of access to the block of non-volatile memory is restricted;
receive a cryptographic signature associated with the command; and
output a verification signal based on the cryptographic signature; and
latch circuitry, separate from the block of non-volatile memory, configured to:
receive the verification signal; and
enable or disable access to the block of non-volatile memory, associated with the latch circuitry, based on the verification signal,
wherein the latch circuitry comprises:
one or more lock circuits that store information indicating whether the block of memory is locked for one or more functions;
one or more NOR gates, each configured to receive an input of the verification signal and an input based on the one or more lock circuits; and
a multiplexer configured to receive an input from an output of the one or more NOR gates,
wherein access to the block of non-volatile memory is enabled or disabled based on an output of the multiplexer.

16. The device of claim 15,
wherein the latch circuitry is further configured to:
receive a command signal based on a command type of the command, wherein the command type is one of a read command type, a write command type, or an erase command type; and
wherein the latch circuitry, to enable or disable access to the block of non-volatile memory, is configured to enable or disable access to the block of non-volatile memory further based on the command signal.

17. The device of claim 15,
wherein the latch circuitry includes one or more lock circuits configured to store an indication of whether the block of non-volatile memory, associated with the latch circuitry, is locked for at least one of read access, write access, or erase access.

18. The device of claim 15,
wherein the controller is further configured to:
- determine, based on a stored block lock record and a block address of the block of non-volatile memory, that the block of non-volatile memory is locked for a command type associated with the command, wherein the command type is one of a read command type, a write command type, or an erase command type;
- determine that the cryptographic signature is verified; and
- output the verification signal to enable access to the block of non-volatile memory based on determining that the block of non-volatile memory is locked for the command type and that the cryptographic signature is verified.

19. An apparatus, comprising:
- means for receiving an instruction to restrict access to an individual block of memory that is one of multiple blocks of memory included in the apparatus;
- means for storing, based on receiving the instruction, a restriction indication that indicates that access to the individual block of memory is restricted;
- means for programming, based on the instruction, latch circuitry to control access to the individual block of memory,
- wherein the latch circuitry comprises:
  - a lock circuit that stores information indicating whether the individual block of memory is locked for one or more functions;
  - a NOR gate, configured to receive an input of a verification signal and an input based on the lock circuit; and
  - a multiplexer configured to receive an input from an output of the NOR gate, wherein access to the individual block of non-volatile memory is enabled or disabled based on an output of the multiplexer;
- means for receiving a cryptographic signature and a command to access the individual block of memory; and
- means for enabling or disabling access to the individual block of memory based on the command, the cryptographic signature, and the restriction indication.

20. The apparatus of claim 19, further comprising:
- means for receiving an instruction to modify the restriction indication;
- means for cryptographically verifying the instruction to modify the restriction indication; and
- means for modifying the restriction indication based on cryptographically verifying the instruction to modify the restriction indication, wherein the restriction indication is modified in volatile memory and non-volatile memory.

21. The apparatus of claim 19, further comprising:
- means for copying the restriction indication and separate restriction indications, for each individual block of the multiple blocks of memory, from non-volatile memory of the apparatus to volatile memory of the apparatus during initialization of the apparatus.

22. The apparatus of claim 19,
wherein the means for storing the restriction indication includes means for storing a block lock record, that stores separate restriction indications for each individual block of the multiple blocks of memory, in a reserved block of non-volatile memory included in the apparatus.

23. The apparatus of claim 22, wherein the block lock record is configured to store one of:
- an explicit indication of a block address, of the individual block of memory, in association with the restriction indication; or
- the restriction indication without a block address, wherein a logical memory position of the restriction indication indicates a corresponding block to which the restriction indication applies.

24. The memory device of claim 1, wherein the latch circuitry comprises:
- a bad block circuit that stores a bit indicating whether the block of memory is a bad block of memory;
- an inverter configured to receive an input from an output of the lock circuit,
- wherein the NOR gate is configured to receive an input from an output of the inverter; and
- an OR gate configured to receive an input from the output of the multiplexer and from an output of the bad block circuit,
- wherein an output of the OR gate enables or disables access to the block of memory.

25. The device of claim 8, wherein the latch circuitry comprises:
- a bad block circuit that stores a bit indicating whether the block of memory is a bad block of memory;
- one or more inverter circuits, each configured to receive an input from an output of a respective lock circuit of the one or more lock circuits, wherein the one or more NOR gates are configured to receive an input from an output of a respective inverter circuit of the one or more inverter circuits; and
- an OR gate configured to receive an input from the output of the multiplexer and from an output of the bad block circuit,
- wherein an output of the OR gate enables or disables access to the block of memory.

* * * * *